United States Patent [19]
Chow et al.

[11] Patent Number: 5,999,528
[45] Date of Patent: Dec. 7, 1999

[54] COMMUNICATIONS SYSTEM FOR RECEIVING AND TRANSMITTING DATA CELLS

[75] Inventors: Henry Chow, Kanata; Michael Gassewitz, Dunrobin; Jim Ghadbane; Charles Mitchell, both of Nepean; Germain Bisson; Steve Bews, both of Stittsville, all of Canada

[73] Assignee: Newbridge Networks Corporation, Canada

[21] Appl. No.: 08/727,535

[22] PCT Filed: Apr. 28, 1995

[86] PCT No.: PCT/CA95/00248

§ 371 Date: Oct. 24, 1996

§ 102(e) Date: Oct. 24, 1996

[87] PCT Pub. No.: WO95/30318

PCT Pub. Date: Nov. 9, 1995

[30] Foreign Application Priority Data

Apr. 29, 1994 [GB] United Kingdom ............. 9408574

[51] Int. Cl.[6] .................................................. H04L 12/56
[52] U.S. Cl. ..................... 370/365; 370/380; 370/395
[58] Field of Search ..................... 370/242, 244, 370/250, 352, 357–359, 362, 364, 365, 380, 384, 388–391, 395, 398, 399; 340/826; 379/271–273

[56] References Cited

U.S. PATENT DOCUMENTS

| | | | |
|---|---|---|---|
| 4,885,741 | 12/1989 | Douskalis | 370/362 |
| 5,202,883 | 4/1993 | Hatherill et al. | 370/362 |
| 5,452,330 | 9/1995 | Goldstein | 370/395 |
| 5,526,344 | 6/1996 | Diaz et al. | 370/364 |
| 5,537,400 | 7/1996 | Diaz et al. | 370/396 |
| 5,539,733 | 7/1996 | Anderson et al. | 370/362 |

*Primary Examiner*—Chau Nguyen
*Attorney, Agent, or Firm*—Dilworth & Barrese

[57] ABSTRACT

A communication system comprising a hub slot adapted to receive any one of a plurality of hub cards for receiving and transmitting data cells; a plurality of universal card slots; a plurality of interface cards insertable in any one of the plurality of universal card slots for receiving incoming ones of the data cells containing data and transmitting outgoing ones of the data cells containing data; an add bus having respective data links connected between individual ones of the universal card slots and the hub slot for receiving the outgoing ones of the data cells from the plurality of interface cards and transmitting the outgoing ones of the data cells to the hub slot; a drop bus having a single data link connected between all of the universal card slots and the hub slot for transmitting the incoming ones of the data cells from the hub slot to the plurality of interface cards; and an arrangement within each of the interface cards for filtering the incoming ones of the data cells from the drop bus and thereby routing the data cells to an appropriate one or more of the plurality of interface cards.

12 Claims, 14 Drawing Sheets

COMMUNICATIONS SYSTEM FOR RECEIVING AND TRANSMITTING DATA CELLS

FIELD OF THE INVENTION

This invention relates in general to digital communication systems, and more particularly to a novel switching system using asynchronous transfer mode (ATM) transmission and switching of information.

BACKGROUND OF THE INVENTION

The emergence of high-speed asynchronous transfer mode (ATM) communications is a recent result of the diverse demands now being made on enterprise backbone networks. Early enterprise networks were dominated by voice traffic with only a relatively small amount of circuit bandwidth devoted to data and other applications. More recently, a range of new applications has evolved resulting in significant changes to existing backbone networks. High-bandwidth video telephony and video conferencing, for example, are rapidly becoming essential requirements in digital communication systems. Similarly, the bandwidth requirements for LAN (Local Area Network) interconnection across multiple sites is also increasing as established prior art LAN systems such as Ethernet™ and Token Ring are upgraded to meet the demands of faster communication and more sophisticated processing.

For example, Fibre Distributed Data Interface (FDDI) LANs operating at 100 Mbps are presently being deployed while even higher bit rates LAN types are emerging as a result of text-based personal computers being replaced by multi-media work stations and associated servers. Typically, multi-media work stations and their associated servers support document architectures that comprise not only text but also high resolution still images and moving images with sound. Thus, instead of inter-site LAN traffic being dominated by file transfers of textual information as in the prior art, LAN file transfers in newer systems are migrating towards higher volume, high bit-rate mixed-media traffic.

The combined effect of such developments has necessitated the development of a more flexible method for the allocation of transmission bandwidth in order to efficiently utilize inter-site leased circuits associated with enterprise networks.

The developments discussed above are not limited to private networks, but are occurring in public carriers as well.

In order to meet these new demands in private and public digital communication systems, an international standard operating mode has been developed for use with broadband integrated services digital networks (BISDN) based on the asynchronous transfer mode (ATM) of transmission and switching. The aim of the ATM protocol is to provide a more flexible facility for the transmission and switching of mixed-media traffic comprising data, voice, still and moving images and video. Traditionally, constant bit rate traffic such as voice has been transmitted and switched using pre-assigned time slots, whereas data is normally transmitted in the form of variable length frames which are multiplexed together on a statistical basis. According to the ATM protocol, transmission and switching is performed on fixed-sized units referred to as "cells". Cells from different sources (eg. voice, data, video, etc.), are multiplexed together on a statistical basis for transmission purposes.

Each standard ATM cell is 53 bytes in length, comprising a 48-byte information field (also referred to as the "payload"), and a five-byte header containing routing and other fields.

Like packet and frame switching, ATM operates on a virtual call/connection basis. This means that prior to any user information cells being sent, a virtual connection is first placed through the network. During this phase, a virtual connection identifier (VCI) is assigned to the call at each interexchange link along the route. The assigned identifier, however, has only local significance to a link and changes from one link to the next as the cells relating to a connection pass therethrough. This means, therefore, that the routing information carried in each cell header can be relatively small.

In particular, each incoming link/port has associated therewith a routing table that contains the corresponding output link/port and a new VCI to replace the incoming VCI for the subsequent link/port. The routing of cells in both directions along a predetermined route is therefore extremely fast as it involves only a simple look-up operation. As a result, cells from each link can be switched independently and at very high rates. This allows parallel switch architectures to be used and high-speed circuits (ie. in the gigabit-per-second range), each operating at its maximum capacity.

In practice, the VCI is made up of two sub-fields: a virtual path identifier (VPI) and a virtual channel identifier (VCI). The VPI field relates to statically assigned connections whereas the VCI field relates to dynamically assigned connections. Routing can be performed using one or the other, or a combination of the VPI and VCI subfields. For example, a virtual path may be set up through the network on a semi-permanent basis (by network management) between each pair of network endpoints. The cells relating to multiple (ie. concurrent) calls between these end points are then multiplexed together and then routed along the same assigned path. In this example, therefore, the routing of cells within the network is performed using the VPI field and the VCI field would be used at the end point to relate cells to a particular call.

The ATM reference model defines three protocol layers, as follows: (1) ATM adaptation layer which overlies the (2) ATM layer which overlies the (3) physical layer.

The ATM adaptation layer (AAL) provides a range of alternative service classes for performing an adaptation function between the class of service provided to the user (e.g. for the transport of data frames between two LANs), and the cell-based service provided by the ATM layer.

The ATM layer provides the required multiplexing of cells relating to different connections into a single stream of cells, and the subsequent demultiplexing of the cell streams. The ATM layer also effects the required routing/relaying of cells based )ria the VPI and/or VCI fields.

The physical layer interfaces with the particular transmission medium which carries the actual cells (eg., fibre optic, coaxial cable, etc.), and may be implemented via a number of different communication technologies depending on the type of transmission being used (eg. plesiochronous or synchronous). For the former, the transmitter establishes a frame structure over the bit/byte stream that exactly matches the ATM cell. The receiver then processes the incoming byte stream on a byte-by-byte basis until a valid 5-byte cell header is formed. The incoming byte stream is then processed on these fixed cell boundaries. In the case of a synchronous link (e.g. OC3/STM1), the frame payload field is not a multiple of the cell size and hence the cell boundaries will change from one frame to the next. With this type of link, therefore, a pointer in the overhead channels is used to identify the start of the first cell boundary in the payload field while cell delineation is performed based on the HEC byte (discussed in greater detail below).

As discussed above, the ATM layer performs all of the functions relating to the routing and multiplexing of cells over virtual connections which may be semi-permanent or set up on demand. For the latter, a signalling protocol is implemented which is similar to that used with ISDN.

There are two different header formats for standard ATM cells commonly referred to as UNI and NNI. Each format incorporates a VPI field as the first byte. However, for the format used over a user-network access link intended for use by user devices that generate and receive cells directly, the four most significant bits of the first header byte are replaced by a generic flow control (GFC) field that has only local significance over the link and is included to allow cells to be allocated different priorities. This field is not present within the network, however, and instead the VPI field is extended across the entire byte.

The second byte of the header comprises a first nibble which is an extension of the VPI field. Thus, for the format used over a user-network access link, the VPI, field is eight bits, whereas within the network the VPI field is twelve bits. The least significant four bits in the second byte of header information comprises a first portion of the VCI field. The third byte of the header continues the VCI field and the first four most significant bits of the fourth byte of the header complete the VCI field. Thus, the VCI field in a standard ATM header consists of sixteen bits. The four least significant bits of the fourth header byte include (1) a payload type (PT) field which is used to enable cells relating to the C and M planes associated with the ATM reference model to be differentiated from cells containing user information, and (2) a cell-loss priority (CLP) bit. The CLP bit is used to allow a user to indicate those cells associated with a connection which should be discarded first. This is useful because an ATM network operates by multiplexing on a statistical basis so that it is possible for cell buffers to overflow within an exchange.

Finally, a header error control (EC) field is provided as a variation of an eight-bit cyclic redundancy check (CRC) polynomial for detecting errors in the header. If the CRC polynomial fails, the cell is discarded. However, for single-bit errors, hardware may be provided to correct the error based on information from the HEC field.

There are a number of areas in the design of existing ATM-based communications systems where substantial improvements may be made in signal routing efficiency, diagnostic support and hardware simplification.

Firstly, it is desirable to provide a system which can flexibly accommodate a variable number of interface circuits per switch fabric interface, depending on interface card bandwidth. Prior art systems have been provided with fixed bandwidth for each interface card within such systems.

Secondly, while the virtual connection identifier (VCI) may be used to establish routing of a cell from link-to-link on a point-to-point basis or "shared" front one point to several destinations (i.e. point-to-multipoint), it can only do so at the expense of costly and complex circuitry. Similarly, only a rudimentary level of cell priority queuing is possible using standard ATM cell headers. Also, according to many prior art systems, intershelf communication has been via parallel busses which are of inherently low speed and low bandwidth. Therefore, there is a need for inexpensive enhanced routing capability of ATM cells both inter-node and intra-node within such communications systems.

Thirdly, since cell streams in an ATM communication system are essentially point-to-point and terminate in queu-ing points, there is normally no need to maintain synchronous timing throughout the switching fabric. However, since some interface cards require a standard timing reference, it is desirable to maintain system timing in such a system. The standard method for maintaining intra-node system synchronization in an asynchronous serial link (eg. intershelf link), is to run a synchronous timing link throughout the system. However, such systems suffer from jitter transfer problems resulting from synchronously regenerated timing signals due to instability of chaining phase locked-loops (PLL).

Alternatively, some prior art systems maintain synchronization by providing a dedicated timing wire from the system synchronization unit (SSU) to all timing destinations. This effectively restricts the location of the SSU to a predetermined slot in the system which is specifically wired to receive it.

Accordingly, there is a need to maintain system synchronization without extra timing wires and without suffering from loss of sync and other problems inherent in prior art PLL synchronization systems.

Fourthly, in prior art systems debug access to the operating software in the system is provided by a special software load with debugging code built in, and a dedicated hardware debug port must be provided onto which debug equipment must be attached in order to gain access to the debug software. It is desirable to provide a system in which the debug software is always in place and in which the development system support communications are integrated into the ATM fabric.

Finally, it is desirable to provide system redundancy for improved reliability of critical system functions.

Other opportunities exist for the improvement of ATM communications systems design, such as in the areas of control communications, queue servicing algorithms, node synchronization architecture, etc.

SUMMARY OF THE INVENTION

According to the present invention, an improved ATM communications system is provided the design of which has been directed by the desire to address the prior art problems discussed above.

Firstly, the maximum utilization of the switching core is achieved in the system of the present invention by providing a variable number of Universal Card Slots (UCS) per Inter Shelf Link (ISL), depending on the interface card bandwidth. For example, a large number of low-speed UCS cards may be provided in one embodiment, while fewer high-speed UCS cards may be provided in another embodiment, and in each case switching core efficiency may be optimally maintained.

Secondly, with respect to the problem of routing ATM cells within the communication system, according to the present invention a plurality of overhead bytes are pre-pended to the standard 53 byte ATM cell in order to facilitate cost-efficient cell routing on a point-to-point basis or a point-multipoint basis within the system, with cell priority queuing, simplified egress statistics gathering, and error detection across the pre-ended bytes and the four bytes of the ATM header (with the HEC field omitted).

Thirdly, with respect to the problem of maintaining system synchronization, according to the present invention an 8 Khz timing signal is embedded in Ordered Sets (discussed in greater detail below) which are transported over the ISLs and can appear anywhere in a "Supercell" framing structure (the concept of a "Supercell" is discussed in greater detail below). Therefore, the timing signal is independent of any serial data clock, as contrasted with prior art synchronous systems. No special jitter reducing circuitry or wiring is required, and the timing source and SSU can be located anywhere within the switching fabric to which the ATM cells may be directed, in contrast with prior art synchronization systems using a dedicated timing wire.

Fourthly, with respect to development system support, according to the present invention an integrated real-time development system is provided wherein the debug software is permanently installed in the system and in which the development system support communications are integrated into the ATM fabric, such that the prior art requirement for special debug equipment at a customer site is minimized, if not entirely eliminated.

Finally, the system architecture of the present invention allows for switch fabric redundancy.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
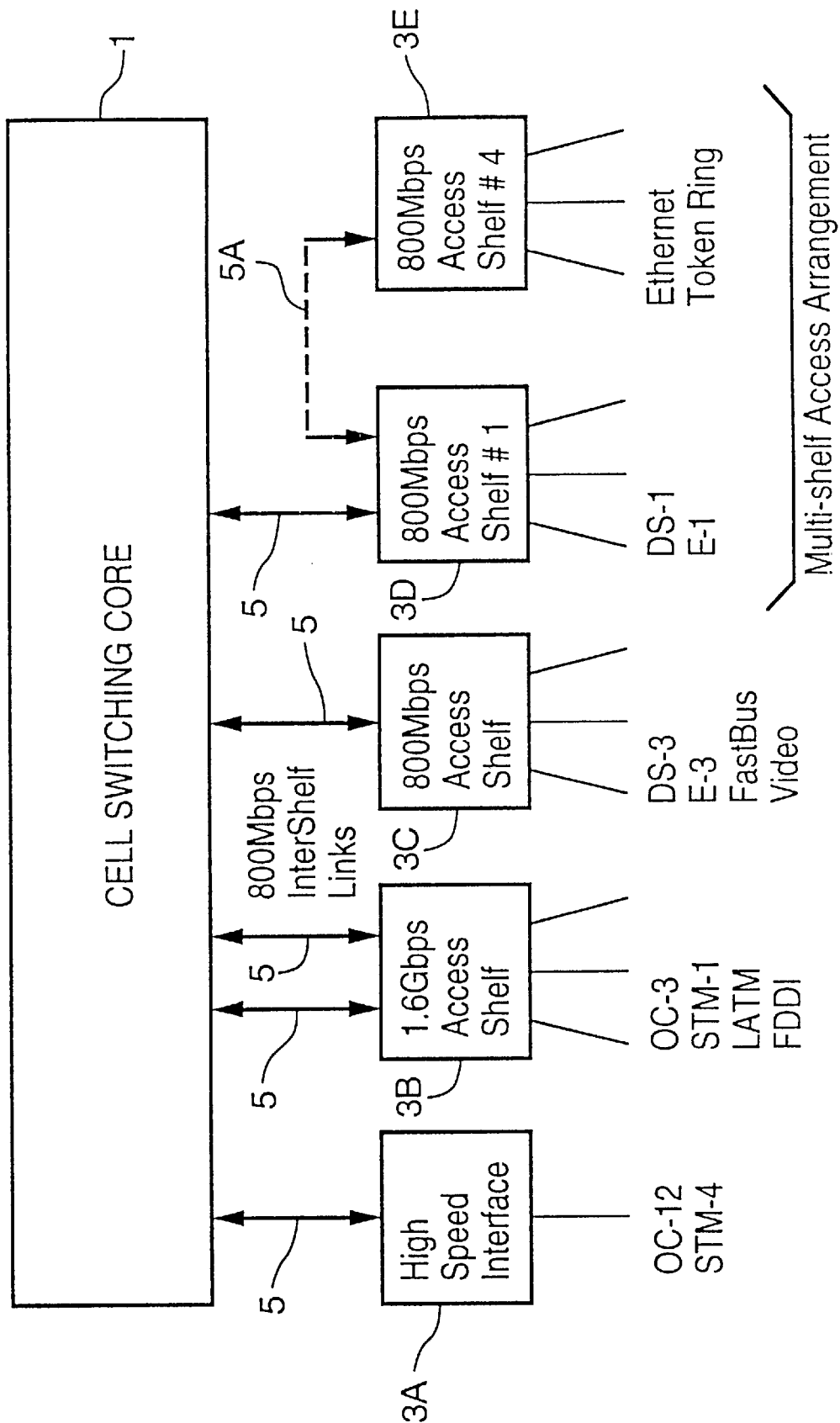
FIG. 1 is a block diagram of an exemplary digital communication system implementing the method and apparatus of the present invention.

With reference to FIG. 1, a block diagram is provided of a switching architecture for implementing the method and apparatus of the present invention in accordance with one embodiment. The system comprises a cell switching core, 1 connected to a plurality of interface card access or peripheral shelves 3A, 3B, etc., via respective 800 Mbps inter-shelf links (ISL) 5. In the present disclosure, the terms "access shelf" and "peripheral shelf" will be used interchangeably throughout. In a multi-shelf access arrangement such as shown with reference to blocks 3D and 3E, a further ISL 5A may be provided directly between the access shelves. Furthermore, in some system "stand-alone" configurations, a single interface card peripheral shelf may be provided without the requirement of a cell switching core 1. Alternatively, a multi-shelf access arrangement such as shown with reference to blocks 3D and 3E may be provided in stand-alone configuration with a switching circuit incorporated directly into each peripheral shelf.

All external interfaces (e.g. OC-3, video, FDDI, etc.) terminate on interface cards located in twelve universal card slots (UCS) located on each peripheral shelf 3B, 3C and/or 3D, as discussed in greater detail below with reference to FIG. 2. In the multi-shelf access arrangement 3D and 3E, up to ninety-six (96) universal and slots may be provided for each inter-shelf link (ISL) 5. Furthermore, according to the present invention the number of UCS interface cards sharing an ISL may be made variable depending on the interface card bandwidth. For example, a large number of low-speed UCS cards may be provided in one embodiment (eg. 3D), while fewer high-speed UCS cards may be provided in another embodiment (eg. 3B). This flexibility provides better utilization of the cell switching core 1 and provides more control of statistical gain.

Each 800 Mbps ISL 5 is adapted to transmit ATM cells between the cell switching core 1 and associated ones of the access shelves 3A, 3B, etc. using either electrical or optical, full duplex, fibre channel (FC-0 and FC-1 only) interfaces, in a well known manner.

Figure 2:
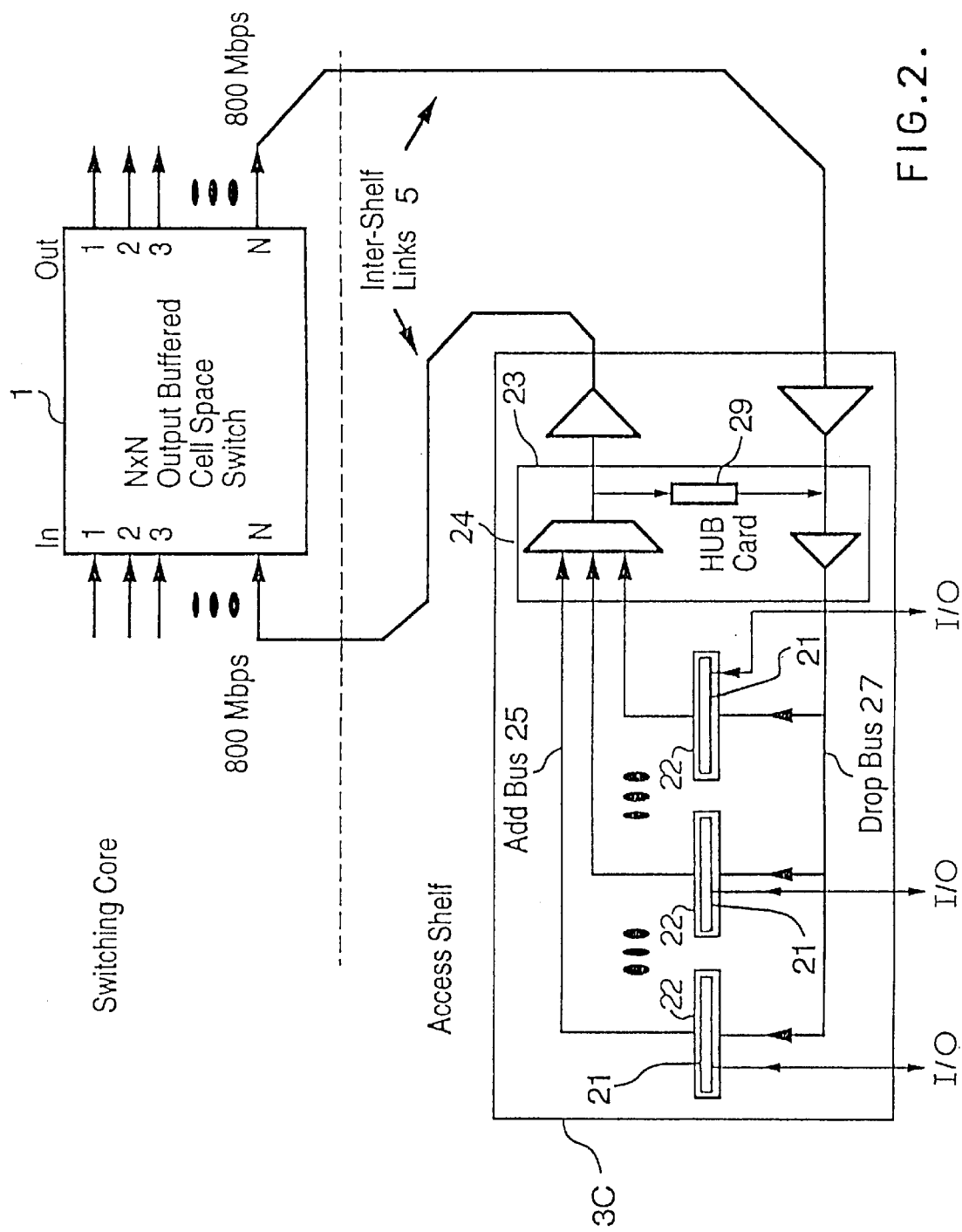
FIG. 2 is a block diagram showing the cell switching core in greater detail connected to an exemplary peripheral shelf of the system illustrated in FIG. 1.
Figure 15:
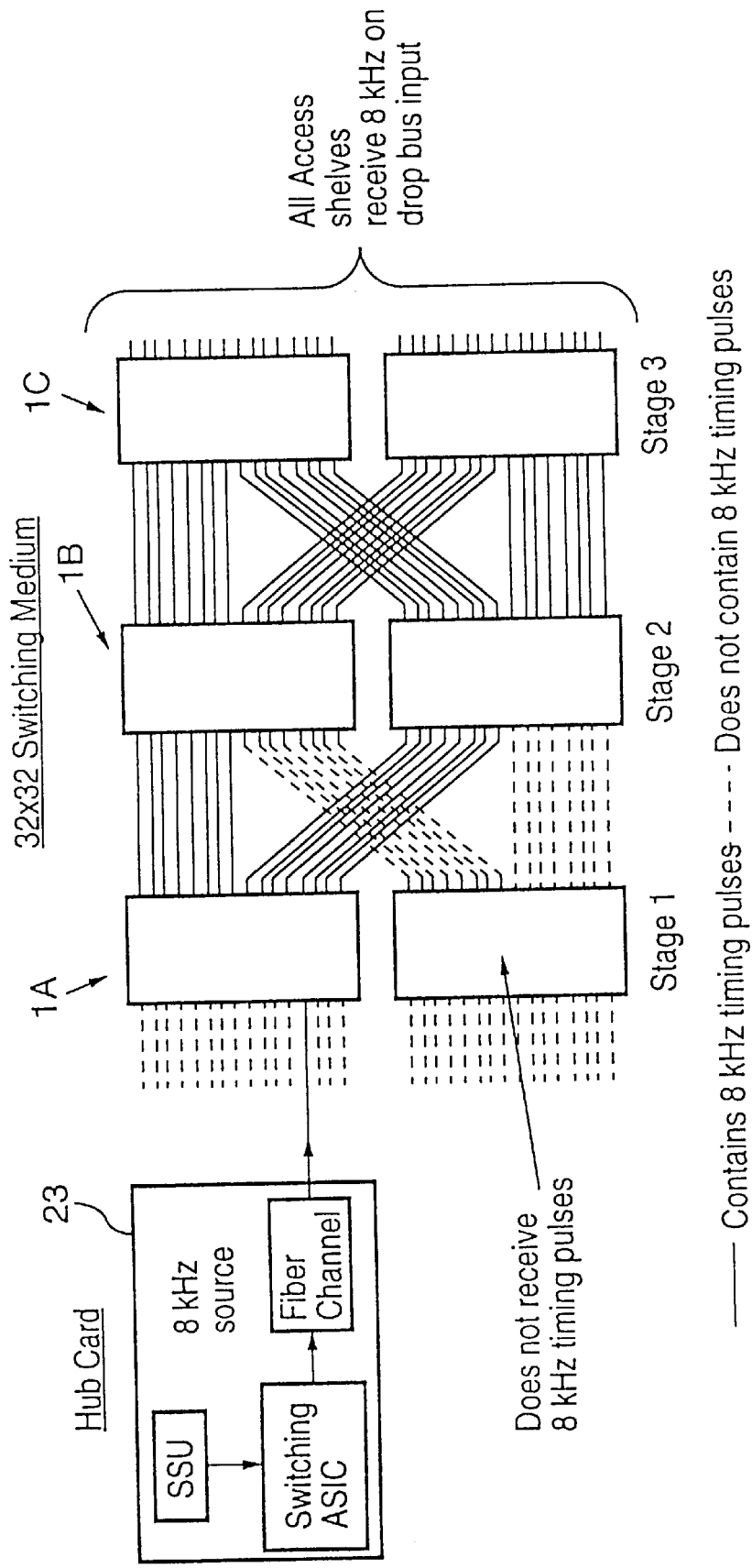
FIG. 15 is a block diagram showing distribution of timing information through the communication system of FIGS. 1 and 2, according to the present invention.

Turning to FIG. 2, the cell switching core 1 is shown functionally As providing inter-shelf cell switching for respective ones of the access shelves 3A, 3B, etc. The switching core 1 uses an input cell filtering and output queuing architecture to implement a cell space switch (i.e. cells can be switched to any output from any input). In the preferred embodiment, the switching core 1 can range from 2 to 256 ISL ports per system. Therefore, the maximum switching capacity is 256 ISL/system×800 Mbps/ISL=204.8 Gbps/system. The cell switching core 1 incorporates a plurality of dual switching cards (such as 1A, 1B and 1C shown in FIG. 15). Each such dual switching card has access to the switching core 1, and provides two output ISLs 5 for connecting up to two peripheral shelves 3A, 3B, etc.

In FIG. 2, a representative peripheral shelf 3C is shown connected to the switching core 1 via respective ISLs 5. As discussed above, the peripheral shelf 3C incorporates twelve universal card slots (UCS) 22 for receiving respective interface cards 21 for implementing all interface (ie. between the switching fabric and the outside world via I/O interfacing to optical, coax, or other physical medium), control and resource functions. For the purpose of describing the present invention, the terms "interface card" and "UCS card" may be used interchangeably. Each peripheral shelf, such as the shelf 3C shown in FIG. 2, includes two special purpose hub cards (only one hub card 23 being shown for ease of illustration), which form part of the entire switching fabric. The switching fabric of the preferred embodiment is fully duplicated for redundancy. Accordingly, one hub card is provided for each half of the fully duplicated switching fabric. The hub card 23 is releasably disposed in a hub slot 24, and multiplexes and concentrates cells from multiple interface cards 21 onto the 800 Mbps intershelf links (ISLs 5) connected to the switching core 1. Each UCS 22 housing an interface card 21 has a 200 Mbps interface to the hub card 23, designated as an add bus 25. As discussed above, the hub card 23 terminates an ISL 5 from the switching core 1 and drives a further 800 Mbps shared bus on the backplane, this bus being designated as the drop bus 27 from which the UCS cards 21 filter received ATM cells. The hub card 23 also includes a loop-back circuit 29 which is normally provided for diagnostic purposes. However, in a stand-alone configuration of the access or peripheral shelf 3C, the loop-back 29 can be used for directing the 800 Mbps data which is concentrated front the add bus 25 back to the 800 Mbps drop bus 27.

The system has a duplicated ATM switching fabric for fault tolerance. The major components of the switching fabric are the hub cards 23, switching shelf 1, and the ISL cables 5. The interface cards 21 put customer data onto both fabrics.

According to a further possible stand alone configuration of the peripheral shelf 3C, the switching core 1 may be effectively incorporated into the peripheral shelf itself where two or more such peripheral shelves with internal switch core are connected together (such as peripheral shelves 3D and 3E connected via ISL 5A in FIG. 1). The number of ports connected to the switching core 1 can be made flexible (eg. a large number of low bandwidth ports may be added) to fully utilize, available bandwidth.

Interfaces which require greater than 200 Mbps of system switching capacity are interfaced directly with the switching core 1 via associated ISLs 5 (e.g. high speed interface 3A in FIG. 1).

As discussed in greater detail below, according to the present invention data on each of the aforementioned 800 Mbps links (ie. ISLs 5, drop busses 27, etc.) is assembled as a succession of "Supercells", each comprising an Ordered Set (ie. 32 bit longword aligned data structure for control information) followed by 128 60-byte proprietary ATM cells. The use of these supercells results in straightforward cell delineation and supports a simple protocol for relaying various types of system level status information.

In operation, for simplified data flow in the aforementioned stand-alone, configuration of the peripheral shelf 3C (i.e. without routing through the switching core 1), each UCS or interface card 21 provides the appropriate line termination, performs AAL/ATM layer processing of received data, adds additional routing information to the ATM cell to create a formatted cell header in accordance with the principles of the present invention, and sends the formatted cells to the hub card 23 over the 200 Mbps add bus 25. As discussed in greater detail below, the formatted cell of the present invention has seven additional overhead bytes pre-pended to the standard 53 byte ATM cell, to form a 60 byte formatted cell.

For 800 Mbps peripheral shelves 3C, the hub card 23 multiplexes and concentrates the formatted cells from the individual UCS cards 21 onto an 800 Mbps cell stream which is looped back via the aforementioned embedded switching core (not shown), or via the loop-back 29 to all of the UCS slots 22 on the common drop bus 27. For other than 800 Mbps peripheral shelves, the loop-back function may or may not be provided internally on the hub card 23. Each interface card 21 filters the cells from the 800 Mbps drop bus 27 using the routing information which was added to the cell header, queues the cells, performs AAL/ATM layer processing on the transmitted data and drives the associated line interfaces via the interface card 21.

For data flow through a larger node which uses switching core 1, the system operates in an identical manner as discussed above in connection with a small node except that instead of looping back the data to the drop bus 27 through the embedded switching core or loop-back 29 of hub card 23, the 800 Mbps cell stream is encoded within hub card 23 with an 8B10B code (as per fibre channel FC-1 standard) mild converted to a 1 Gbaud serial stream which is then sent to the switching core 1 via ISL 5. The cell stream is received by switching core 1 and the cells within the ISL 5 are routed to the proper ISL outputs of switching core 1.

The hub card 23 on the appropriate peripheral shelf (e.g. shelf 3C, etc,), receives the cell stream from the switching core 1 via ISL 5 and in response drives the 800 Mbps shared drop bus 27 on the backplane of the peripheral shelf. Then, as discussed above in connection with the smaller node interconnection, each UCS housing an interface card 21 filters the cells from the 800 Mbps drop bus 27 using the routing information that was added to the cell header, queues the cells, performs AAL/ATM layer processing on the transmitted data and drives the associated line interface via the interface card 21.

The configuration of add bus 25 and drop bus 27 results in a "star bus" topology which provides unique advantages over the prior art in the implementation of a high speed communication system. It is known that high speed data transmission is most easily accomplished with point-to-point transmission lines. Therefore, by splitting the add bus 25 into a plurality of point-to-point links in the present invention, significant advances are made over prior art conventional point-to-multipoint architectures (e.g. using multi-party bi-directional busses). Such prior art systems suffer from the following problems:

low impedance and discontinuous transmission lines due to card loading difficult line terminations high speed busses requiring parallel terminations that consume significant power the effective speed at which the busses can operate is limited by factors such as arbitration for bus mastership.

The point-to-point communication provided by the add bus 25 in the star-bus topology of the present invention overcomes these problems.

In the "drop" direction (i.e. drop bus 27) since all the UCS cards 21 are required to receive all of the incoming data cells, a unidirectional bus 27 is utilized. Since the bus 27 is unidirectional, the topology of the present invention benefits from simple transmission line termination requirements.

According to the present invention, proprietary overhead information is added to the standard 53 byte ATM cell in order to assist in the routing of the cells through the switching fabric. The cell format of the present invention is used on all links between various cards of the system. This includes the links from the UCS cards to the hub card 23, links to and from the switching core 1, and from the hub card 23 to the UCS cards 21.

As discussed above, in accordance with the preferred embodiment, seven bytes are pre-pended to the standard 53 byte ATM cell in order to form a 60byte formatted cell. The additional header information is used to uniquely address any "port" on any UCS housing an interface card 21 and to identify the priority of the attached ATM cell. The additional header information is also used to support a multi-casting capability where the address field identifies a group of UCS interface ports. Use of the additional header information pre-pended to the standard ATM cell allows for improved cell routing over prior art ATM-based switching systems. Unused bits in the header may be used for other control functions (eg. providing signalling information at the discretion of software).

As discussed in greater detail below, there are two cell types defined by the additional header information according to the principles of the present invention, as follows: (1) point-to-point; and (2) point-to-multipoint.

Sending cells to a specific card within the system requires that the cells be routed to the drop bus 27 to which the particular UCS interface card 21 is connected. The card then must filter the cells destined for it from the remaining cells present on the drop bus 27.

When a cell is addressed to a particular UCS interface card 21, the drop bus 27 that the particular card "listens" to is referred to as a "terminal bus" (i.e. the data on the bus is not routed to a subsequent bus). If, on the other hand, a cell is addressed to a card that is part of the switching fabric, the bus that is "listened" to by that card may be an intermediate bus whose data is routed to other buses. In accordance with the present invention, the definition of the routing of the cell through the fabric is identical in both cases. As discussed in greater detail below with reference to FIG. 9, circuitry is provided in each UCS interface card 21 for filtering the cells on the monitored bus in order to recognize correct cells destined for the particular card.

Figure 3:
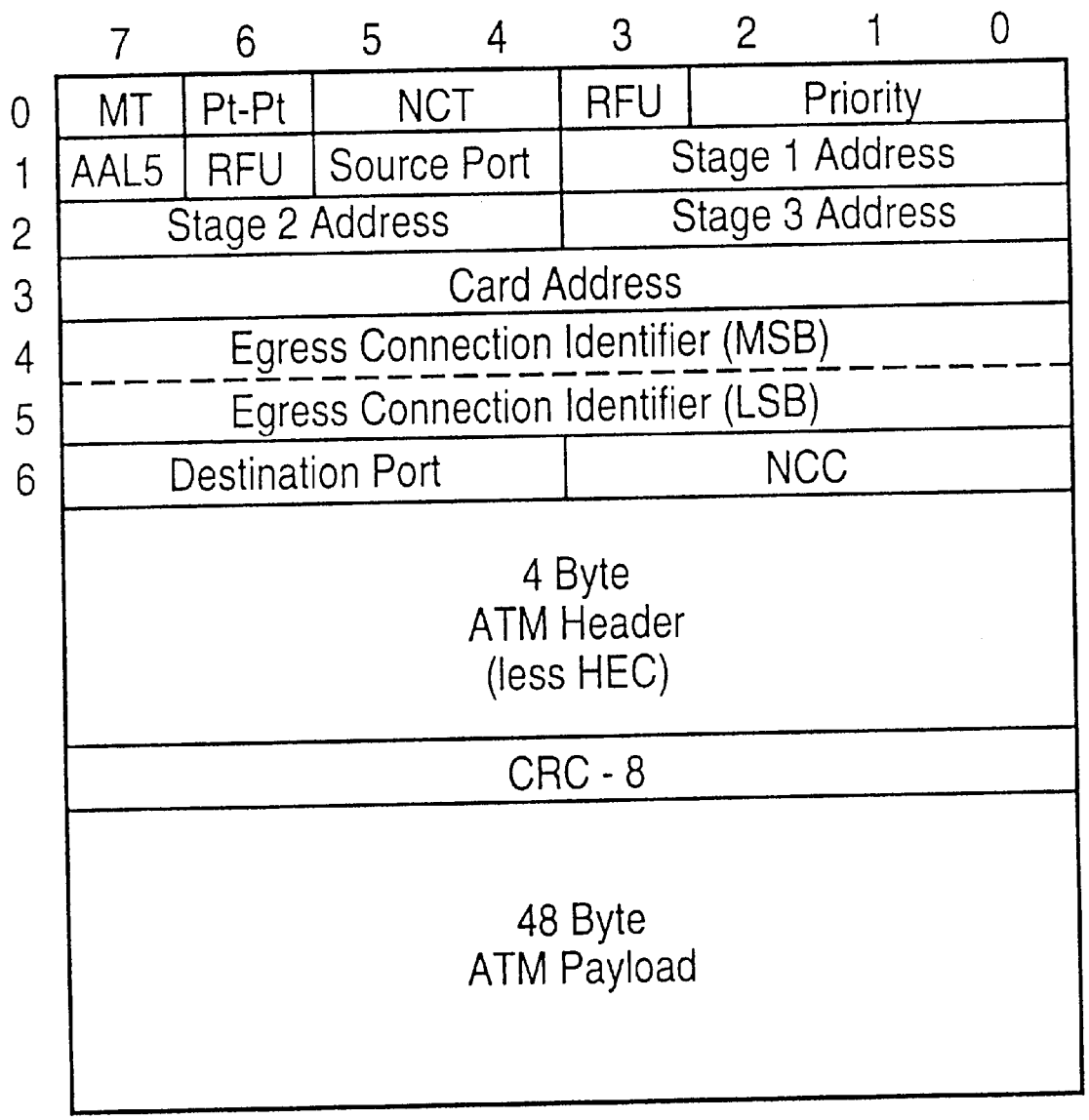
FIG. 3 is a diagram of the modified ATM cell format for point-to-point communication, according to a first embodiment of the invention.

FIG. 3 illustrates a formatted ATM cell in accordance with the present invention, for implementing point-to-point communication. The fields pre-pended to the standard ATM cell are defined in Table A below.

It should be noted that for all field definitions throughout this disclosure, bits are assumed to be transported in the order of left to right and top to bottom. In multi-bit fields, the most significant bit is transported first.

TABLE A

| Field Name | Description |
| --- | --- |
| MT | When this bit is low the cell is considered to be an empty cell. The CRC value is checked to determine if any bit errors occurred, otherwise the cell is discarded without any processing being done. |
| Pt-Pt | Indicates addressing is either for a point-to-point or for a point-to-multipoint connection. "1" = point-to-point; "0" = point-to-multipoint. |
| NCT | Newbridge Cell Type. These bits are used by the interface ASIC to determine if the cell is part of the normal data stream or if it should be routed to the internal control or RDS queues. |
| RFU | Reserved for Future Use. These bits should be set to "0" to guarantee compatibility with future implementations which may use them. |
| Priority | Indicates cell priority. Supports 8 priorities. "000" = Lowest Priority; "111" = Highest Priority. |
| AAL5 | Identifies this cell as being part of an AAL5 frame. |
| Source Port | Indicates the cell's ingress port. Range: 1 . . . 3. Zero is illegal. |
| Stage 1/ Stage 2/ Stage 3 Address | These fields each allow the selection of one output out of sixteen from a switching shelf, with the capability of having three stages of switching shelf. This permits the construction of exceptionally large switching systems. |
| Card Address | This field uniquely identifies a destination element within an ISL. |
| Egress Connection Identifier | This field is set on ingress on the cell relay cards and identifies the connection at the egress point. It is used for performing address translation and statistics gathering on egress. It permits the transmission of an identifier which is easier and more economical to use when updating statistics than the entire VP/VC field of the ATM address. |

TABLE A-continued

| Field Name | Description |
| --- | --- |
| Port | Used by multi-port interface cards to address a port (from up to sixteen). In cells sent to the switching fabric this field is RFU. |
| NCC | Newbridge Communications Channel. This 4-bit will provide for information exchange between cell processing elements in a switch node. Preliminary use may include bits for local switch congestion indication. |
| CRC - 8 | Cyclic Redundancy Check. Provides error detection for the combined Newbridge and ATM header. The polynomial used is $x^8 + x^2 + x^1 + 1$. |

Figure 5:
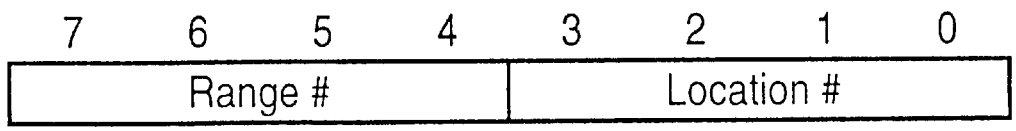
FIG. 5 shows a card address format according to the preferred embodiment.

As indicated in Table A, the card address field is used to select a destination element within an ISL. One possible definition of this field in shown in FIG. 5, although other addressing definitions are possible.

TABLE B

| Field Name | Description |
| --- | --- |
| Range # | The Range number identifies the type of card, and the range of locations to which the address applies. It is encoded in the following format:<br>0000 - UCS Shelf #1, Interface ASIC #1<br>0001 - UCS Shelf #2, Interface ASIC #1<br>0010 - UCS Shelf #3, Interface ASIC #1<br>0011 - UCS Shelf #4, Interface ASIC #1<br>0100 - UCS Shelf #5, Interface ASIC #1<br>0101 - UCS Shelf #6, Interface ASIC #1<br>0110 - UCS Shelf #7, Interface ASIC #1<br>0111 - UCS Shelf #8, Interface ASIC #1<br>1000 - UCS Shelf #1, Interface ASIC #2<br>1001 - UCS Shelf #2, Interface ASIC #2<br>1010 - UCS Shelf #3, Interface ASIC #2<br>1011 - ALL Hub Cards<br>1100 - UCS Shelf #1, Interface ASIC #3<br>1101 - UCS Shelf #2, Interface ASIC #3<br>1110 - UCS Shelf #3, Interface ASIC #3<br>1111 - ALL DSC Cards<br>In this format, Ranges 0–7 correspond to the UCS cards in shelves 1–8. Ranges 8–15 are slightly more complicated. |
| Location # | The Location # identifies a unique location with a range. It is encoded in the following format:<br>UCS Ranges: (Ranges 0–10, 12, 13, 14)<br>    3  2  1  0<br>      Slot #<br>Slot # 0–15 identify the peripheral shelf slots 1–16.<br>HUB Ranges: (Range 11)<br>    3  2  1  0<br>   Shelf #  X/Y<br>Shelf #0–7 identify the chained shelf numbers 1–8.<br>X/Y identifies the fabric with 0 = X, 1 = Y<br>DSC Ranges: (Range 15)<br>    3  2  1  0<br>  RFU  Stage #  X/Y<br>RFU, set = 0 until defined.<br>Stage #0–2 identifies the switching stage 1–3, with (stage #3 is an RFU)<br>X/Y identifies the fabric with 0 = X, 1 = Y. |

Transmitting cells which are part of a point-to-multipoint connection requires that the cell be routed to every drop bus 27 which has a card that is part of the multi-cast group. The cell must also contain a multi-cast identifier that each card checks to determine if the card is part of the predetermined multi-cast group for the cell. This group can then be used to determine which ports of the UCS cards are to use the cell (ie. which interface cards 21 are to receive the data).

Figure 4:
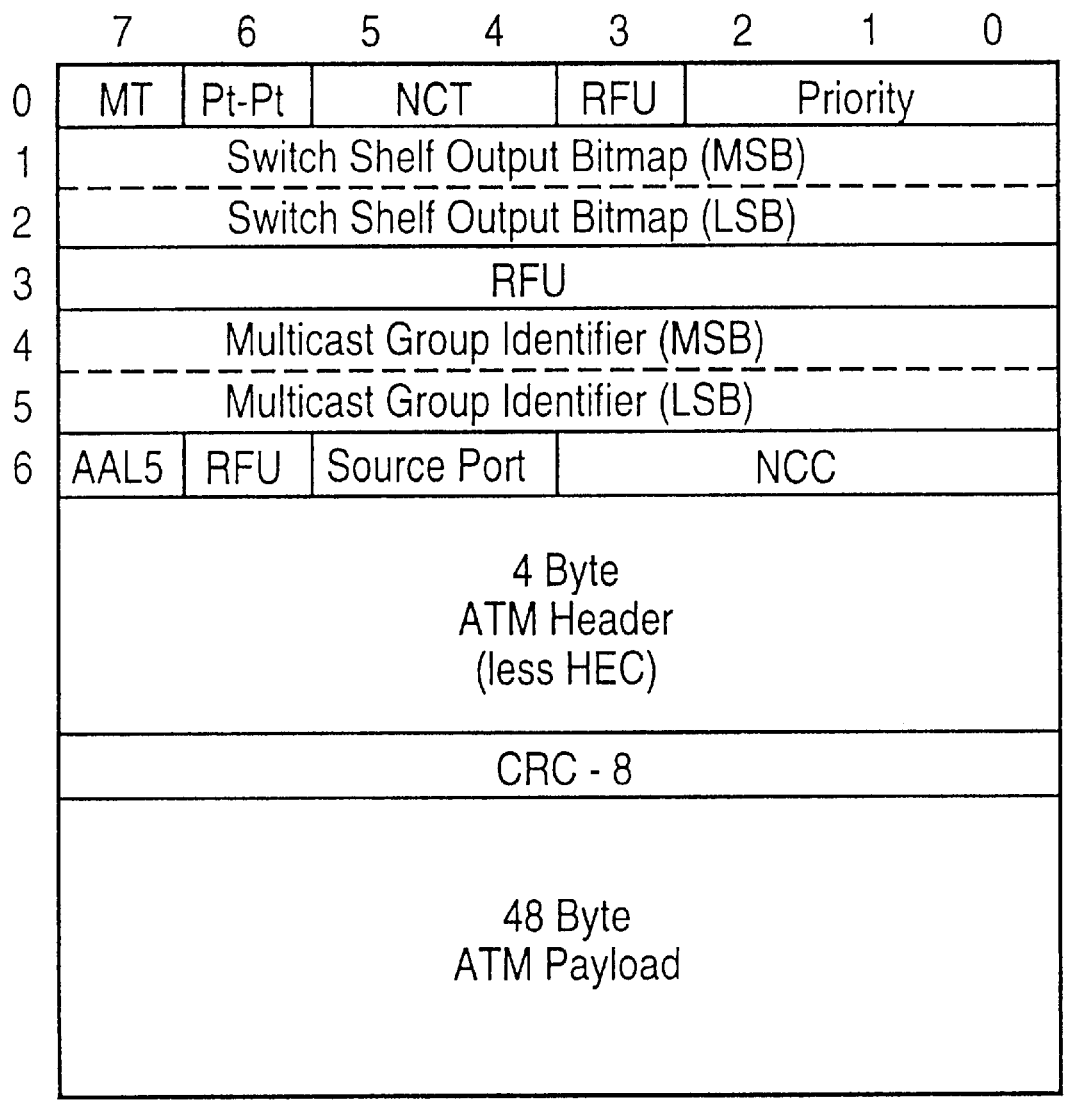
FIG. 4 is a diagram showing the modified ATM cell format for point-to-multipoint communication, according to a second embodiment of the invention.

The cell format of a point-to-multipoint cell is given in FIG. 4. The field definitions are provided in Table D below.

TABLE C

| Field Name | Description |
| --- | --- |
| MT | When this bit is low the cell is considered to be an empty cell. The CRC value is checked to determine if any bit errors occurred, otherwise the cell is discarded without any processing being done. |
| Pt-Pt | Indicates addressing is either for a point-to-point or for a point-to-multipoint connection. "1" point-to-point; "0" = point-to-multipoint. |
| NCT | Newbridge Cell Type. These bits are used by the interface ASIC to determine if the cell is part of the normal data stream or if it should be routed to the internal control or RDS queues. |
| RFU | Reserved for Future Use. These bits should be set to "0" to guarantee compatibility with future implementations which may use them. |
| Priority | Indicates cell priority. Supports 8 priorities. "000" = Lowest Priority; "111" = Highest Priority. |
| RFU | Reserved for Future Use. These bits should be set to "0" to guarantee compatibility with future implementations which may use them. |
| Switch Shelf Output Bitmap | A multicast cell may be routed to multiple drop busses. This is accomplished by bit mapping the output ports of the switching shelf that the cell is to take. |
| Multicast Group Connection Identifier | This field is set on ingress on the cell relay card and identifies a system wide unique Multicast Group. |
| AAL5 | Identifies this cell as being part of an AAL5 frame. |
| Source Port | Indicates the cell's ingress port. Range: 1 . . . 3. Zero is illegal. |
| NCC | Newbridge Communications Channel. This 4-bit will provide for information exchange between cell processing elements in a switch node. Preliminary use may include bits for local switch congestion indication. |
| CRC - 8 | Cyclic Redundancy Check. Provides error detection for the combined Newbridge and ATM header. The polynomial used is $x^8 + x^2 + x^1 + 1$. |

The cell header describes a number of different cell types including data cells, control cells and RDS cells. This allows control and RDS communications to be carried in-band within the data switching fabric. Many systems use an out-of-band control channel which restricts the control card to a specific location in the system. Allowing the control and RDS communications to be carried in-band within the data switching fabric allows scalability to very high bandwidths and increases reliability. In-band communications means that no special hardware or software is required at the local site and debugging can be done remotely.

Figure 6:
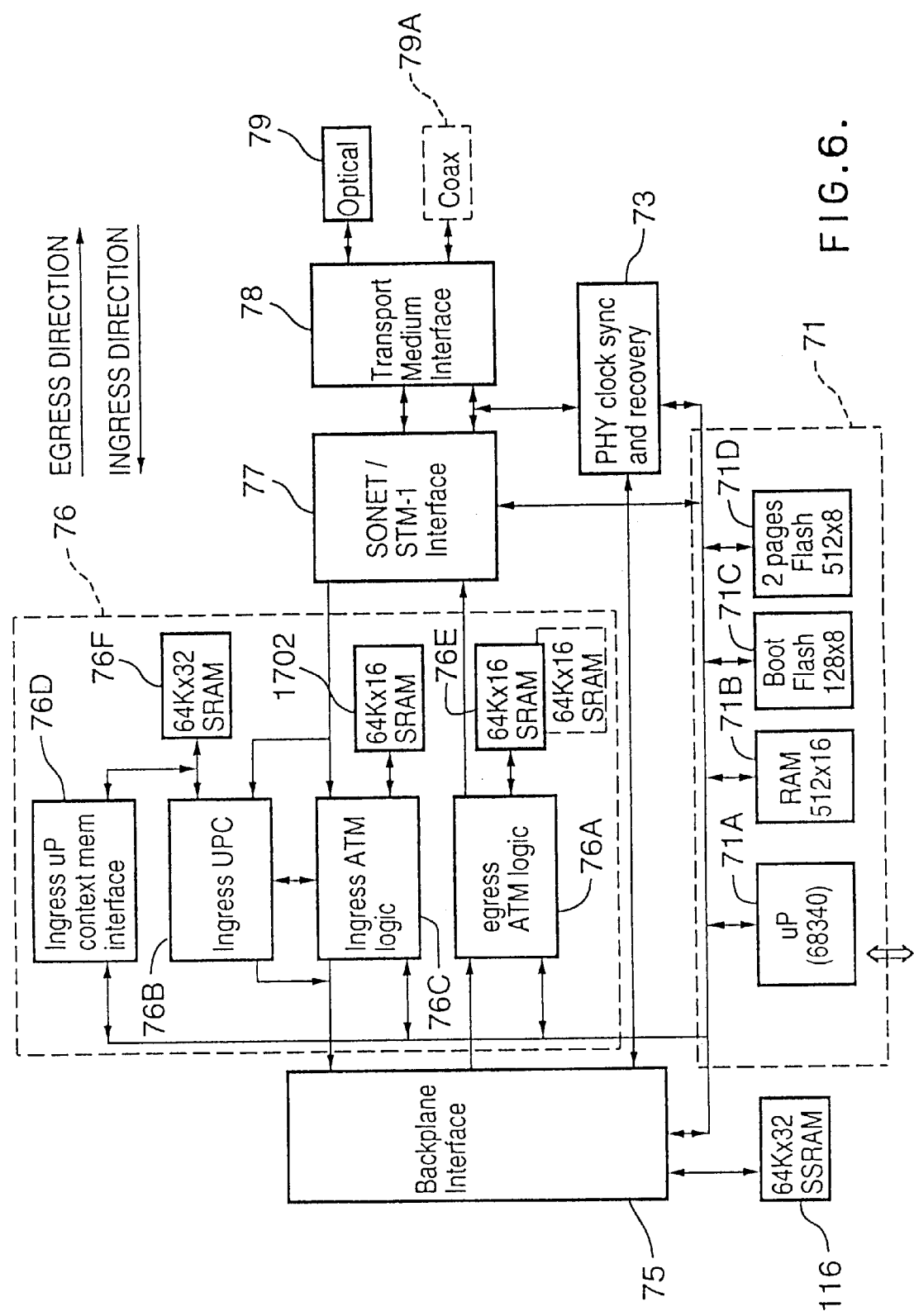
FIG. 6 is a block diagram of an interface circuit for connection to a universal card slot and to external signal carrying media, including circuitry for generating and filtering the proprietary ATM header data according to the preferred embodiment.

Turning now to FIG. 6, the functional blocks of a representative UCS interface card 21 are illustrated. The illustrative example shown in FIG. 6 is an OC-3/STM-1 interface card for connection to a peripheral shelf 3B, 3C, 3D or 3E (FIG. 1). Interface cards which are appropriate for implementing a high speed interface or an 800 Mbps interface may be devised using similar functional elements as shown in FIG. 6.

As discussed above, the basic function of the OC3/STM-1 UCS interface card 21 is to transport ATM cell data between the switching fabric and the SONET/SDH network link. The blocks required to perform this function may be identified as follows:

(1) Control/status block 71;
(2) Synchronization block 73;
(3) Backplane interface block 75;
(4) ATM block 76;
(5) SONET/STM-1 block 77; and
(6) Transport medium and interface block 78.

The control/status block 71 provides coordination of interface functions and establishes node control communication via the backplane interface block 75.

The synchronization block 73 accepts and/or generates a system synchronization reference, as discussed in greater detail below. This block generates timing signals required for all functional blocks of the UCS card 21, including the provision of timing signals whereby the SONET/STM-1 transmission meets predetermined jitter and accuracy requirements if a Synchronization Unit (SU) is located on the UCS card 21.

The backplane interface block 75 processes the specially formatted ATM cells (ie. ATM cells having additional prepended bytes) that are transmitted to and from the switching fabric, and provides data integrity checking, connectivity checking and conversion of cells between the specially formatted ATM cells and standard ATM cells. The functional requirements for this block are discussed in greater detail below with reference to FIG. 9.

The ATM block 76 processes the ATM cells that pass between the backplane interface block 75 and the SONET/STM-1 block 77, including VPI/VCI mapping, usage parameter control (UPC) policing, and per VPI/VCI statistics gathering. ATM block 76 comprises an ingress ATM logic block 76C, an egress ATM logic block 76A, an ingress UPC 76B and ingress microprocessor context memory interface 76D.

The ingress ATM logic block 76C or Ingress Cell Controller (abbreviated as ICC) provides the following ATM layer functionality: (1) VPI/VCI address compression, (2) cell counters, (3) OAM control cell processing, (4) OAM cell extraction, and (5) prepending of the seven header octets to the ATM cell (FIGS. 3 and 4). A 64K×16 SRAM 1702 provides the ICC with per connection OAM functionality and VPI/VCI compression tables.

There is a global bit located in the ICC 76C which is programmed upon initialization to signal an internal address compression block whether the link is UNI or NNI. When the link is UNI, an 8 bit VPI and 16 bit VCI is compressed to 12 bits. When the link is NNI, a 12 bit VPI and 16 bit VCI is compressed to 12 bits (referred to herein as ICI).

The 12 bit resultant ICI allows the OC-3 Card to support up to 4K of connections using any VPI and a VCI within the range of 0 to 4095.

When a cell is received, the VPI is used to index a VP Table. The result is a 16 bit word which determines if this VPI has been enabled and whether it's a VPC or VCC. If the connection is VPC, the VP Table entry also contains a 12 bit ICI. If the connection is VCC, the VP Table contains a VC Table pointer ani a VCI Mask. The VC Table pointer points to one of 17 2K VC Sub Tables. The VCI Mask is used to determine how many of the VCI bits will be used to index the VC Sub Table. This mask must be either 11 or 12. The OC-3 doesn't support any other mask selections. The unused VCI bits are compared to zero. If they contain non-zero values, the cell is considered invalid and the appropriate actions occur. Otherwise, the VC Sub Table entry contains an ICI for the VC connection.

Once ICI has been generated, it is used to point into the ICC's context memory 76D. A bit is checked to verify validity of the connection. If it isn't a valid connection, ICI is ignored, the ingress UPC 76B is advised that it has an invalid cell and the connection's VPI/VCI values are stored into the ICC memory's Invalid Table. If the connection is enabled, ICI is passed to the ingress UPC 76.

The memory accessed by ingress UPC 76B is the 64K×32 memory 76F residing on the ingress UPC's host port. This memory provides the ingress UPC with; UPC information, per connection statistics, NATM header octets (ie. internal Newbridge ATM cell formats in accordance with Tables A and D), and VPI/VCI translation bytes.

The Context Table within memory 76F contains 4K data structures. Each data structure represents information for a VP or VC switching connection. The UPC table contains 1.5×4K (6K) data structures which each represent the necessary information for a bucket.

NATM header registers are provided as memory locations in 76F which contain the seven octets representing the NATM header. These fields are prepended to the beginning of the cell header for use throughout the switching fabric. Included within these fields are port addresses, ECI (Egress Connection Identifier), MGI (Multicast Group Identifier) etc.

The SONET (Synchronous Optical Network)/STM-1 block 77 adapts the ATM cells received from and transmitted to the OC-3/STM-1 physical layer, and provides overhead processing for the section, line and path layers. It also provides line (egress) and diagnostic (ingress) loop back capability. More particularly, the SONET/STM-1 interface block 77 provides both an 8-bit 19.44 Mhz and a serial 155 Mhz access to the Transport Medium Interface 78 and 8-bit 25 Mhz access to the ATM block 76. Multiple serial interfaces are also provided for an optional NNI module.

The interface block 77 also provides (either directly or via the NNI module) full access to SONET/STM-1 framing information and provides four-deep receive and transmit FIFOs (not shown) for the ATM layer interface 76. It also delineates ATM cells and provides HEC checking and correction.

The transport medium interface 78 provides optical (or coax) interfaces, clock recovery and data timing between an optical medium 79 such as fibre optic cable (or coax medium 79A). The transport medium interface 78 also provides electro-optical conversions required to pass the ATM cells to and from the optional OC-3/STM-1 link. The functional requirements for transport medium interface block 78 are discussed in greater detail below.

For signal flow in the egress direction, the backplane interface block 75 monitors the type of formatted ATM cells, and discriminates between data, RDS, control and empty cells. The cell type is determined by its NCT and MT bits (see FIGS. 3 and 4).

Data cells are passed by the backplane interface 75 to the ATM block 76. The destination address of each active cell is checked before the cell is passed to the ATM block. The egress ATM logic 76A strips off the seven formatted ATM cell header octets from each active cell before passing it to the interface 77. The seven formatted ATM cell header octets are generated and added to each cell received in the ingress direction by ingress ATM logic 76C, before transmission to the switching fabric, as discussed in greater detail below.

The RDS and control cells are not transmitted to the ATM block 76. Instead, these cells are stored for use by the control/status block 71. In the ingress direction, RDS and control cells are created by the control processor 71A and inserted into the ingress ATM cell stream for transmission through the switching fabric.

Empty cells passing in the egress direction through backplane interface 75 are discarded. In the ingress direction, a nibble is added to the cell to indicate the start of a cell. If there are no cells to be transmitted to the switching fabric, the link remains idle.

In the egress direction, multicast cells are received and used to look up an enable bit in a multi-cast look-up table (discussed in greater below with reference to FIG. 10). If a match occurs, the cell is accepted; otherwise, it is discarded. Furthermore, point-to-point cells in the egress direction are received and compared to a pair of filter registers (discussed in greater detail below with reference to FIGS. 12 and 13). An exact match is required for the cells to be accepted. Otherwise, the cells are discarded.

Cells passing in the egress direction are placed in one of four priority queues. CLP discard can be enabled and is performed when a programmable discard threshold is matched or exceeded. These queues also provide forward congestion notification if enabled through the PTI bit field of the ATM header. The ASIC incorporated into backplane interface 75 (discussed in greater detail below with reference to FIG. 9) provides statistics for the number of cells arriving (16 bit); the numb er of cells discarded CLP=0 (16 bit ); the number of cells discarded with CLP=1 (16 bit) and the number of cells arriving congested (16 bit). Status flags are also available for full and empty queues; discard state and congested state.

The backplane interface 75 also provides a variety of maintenance featured. Firstly, by defining invalid point-to-point filters for the cell comparison, the control processor 71A is capable of detecting incorrect destination addresses of cells passing through the backplane interface 75 in the egress direction. Also, a loop back function may be provided to the loop ingress path entering the backplane interface block 75 to the egress data path exiting the backplane block. This provides a means to test the ATM block 76 and SONET/STM-1 block 77 during power up diagnostics.

It is necessary for the control/status microprocessor 71A to access the memory 1702 in order to initialize and "rip down" connections. Instead of using a dual port memory architecture, the ICC 76C directly controls the memory. Whenever the microprocessor 71A requires access to the memory, it tells the ICC what it wants to do, and the ICC executes the necessary instructions on behalf of the microprocessor 71A. This way the ICC 76C knows when it isn't using the memory during a cell time and can allot that time for the microprocessor interface 1703.

In addition, the backplane interface 75 is capable of declaring certain alarm conditions. As discussed above, redundancy is provided by means of duplicated drop busses in each peripheral shelf 3A, 3C, etc. Each of the two drop busses provides a loss of clock indicator for the egress cells coming from the switching fabric. A hardware indicator is active when no transition has been detected on the interface clock for 140 nanoseconds. This time is derived from 14 clock cycles of the C 100 M clock utilized by the ASIC discussed below with reference to FIG. 9. The UCS card software monitors ATM receive clock failures for the redundant ATM switch fabrics. The UCS card software provides an alarm indication when this failure is alarmed on the active ATM interface.

The UCS card hardware also monitors the level of the four queues for the egress cells received from the switching fabric. In the event that the buffer fills, the event is counted and aggregated as a statistic value.

Figure 7:
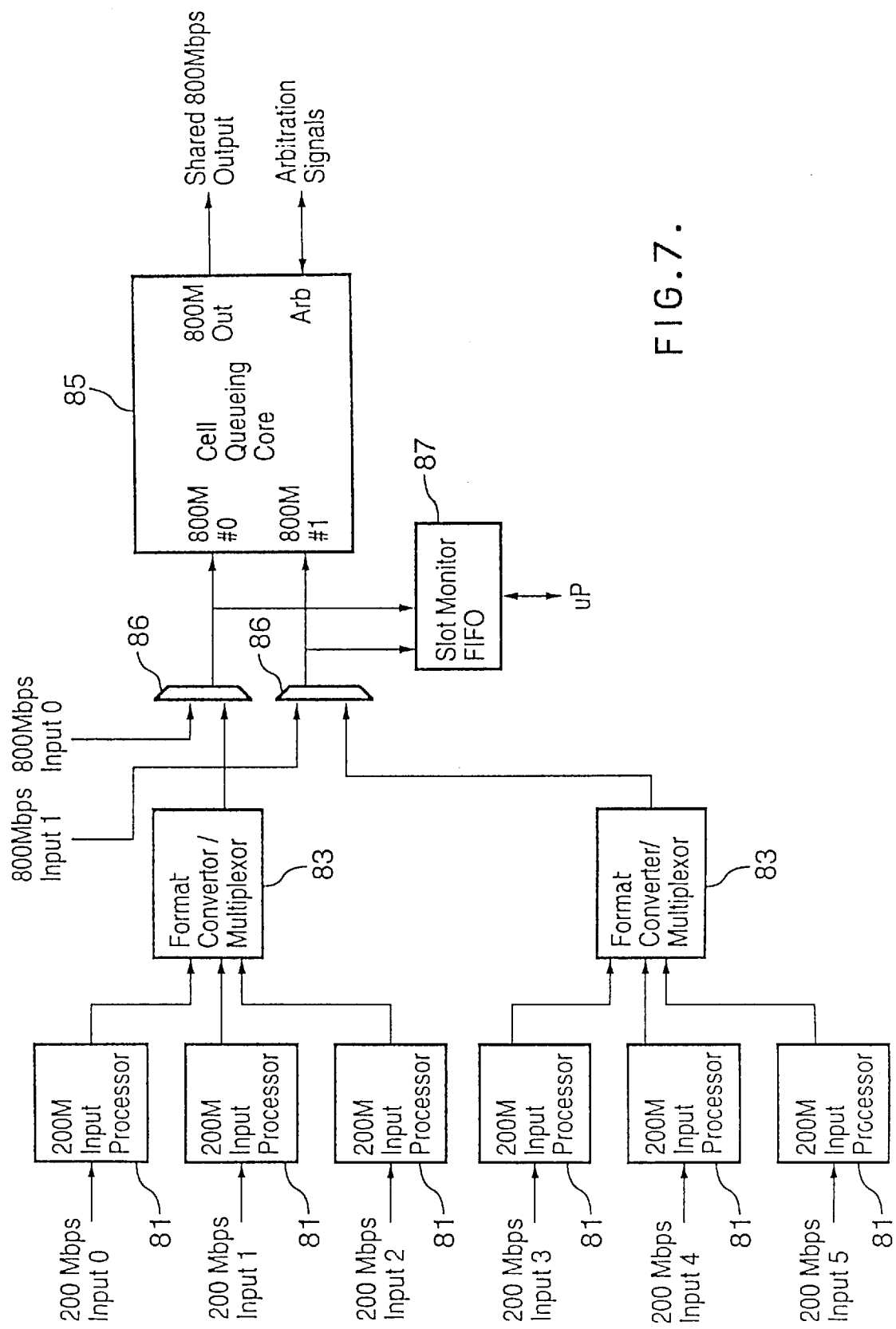
FIG. 7 is a block diagram of a switching ASIC used on a hub card of the peripheral shelf shown in FIG. 2.

According to the preferred embodiment, ATM cell processing is performed by means of a pair of application specific integrated circuits (ASICs) within the switching core 1, hub cards 23 and UCS cards housing interface cards 21. The first ASIC is shown in FIG. 7 for performing a dual purpose switching function. In one application, the circuit of FIG. 7 is used in hub cards 23 of the access shelves 3B, etc., for multiplexing the 200 Mbps data on add bus 25 into a single 800 Mbps cell stream for application to inter-shelf links 5. In the second application, the circuit of FIG. 7 is utilized in the switching core 1 to filter (i.e. switch) a pair of 800 Mbps input cell streams into a single 800 Mbps output stream. The 800 Mbps output stream can then be shared by multiple additional ASICs of the form shown in FIG. 7 to provide filtering (i.e. switching) of the same 800 Mbps output link from multiple input links in the switching fabric.

In the "multiplex mode" of operation, six input processors 81 receive respective 200 Mbps signal streams from respective UCS cards housing interface circuits 21. Thus, by using two of the switching and multiplexing circuits of FIG. 7, the desired functionality of the hub card 23 may be implemented for concentrating twelve 200 Mbps cell streams carried by the add bus 25 into a single shared 800 Mbps output stream. Each 200 Mbps input data stream is processed via a respective processor 81 for cell delineation and for CRC checking. The add bus links 25 from the UCS cards to the hub card 23 consist of a data nibble (i.e. 4 bits) and clock signal only, so that cell delineation may be performed based on a simple algorithm which recognizes cells being preceded by a unique start-of-cell nibble, or other suitable technique.

Each of the format converter/multiplexers 83 gathers the three 200 Mbps streams output from processor 81 and converts them to a single 800 Mbps input stream for further processing by a cell queuing core 85. The cell queuing core 85 is discussed in greater detail below with reference to FIG. 8. A pair of multiplexers 86 respectively select one of either the 800 Mbps input (switching mode) or the three 200 Mbps cell streams output from format converter/multiplexer 83 (multiplex mode) for input to the cell queuing core 85. Thus, the system provides sufficient flexibility to have one of the 800 Mbps inputs to the cell queuing core 85 configured as three 200 Mbps inputs (ie. multiplexer mode) while the other 800 Mbps input is configured as a direct 800 Mbps input (ie. switch mode).

Slot monitor FIFO 87 provides a microprocessor interface to "monitor" a specific 200 Mbps input or a specific 800 Mbps input from the multiplexers 86. The circuit of FIG. 7 captures a cell from the appropriate input link when so directed via the microprocessor port. The microprocessor then directly reads the full 60 byte formatted ATM cell from FIFO 87.

Figure 8:
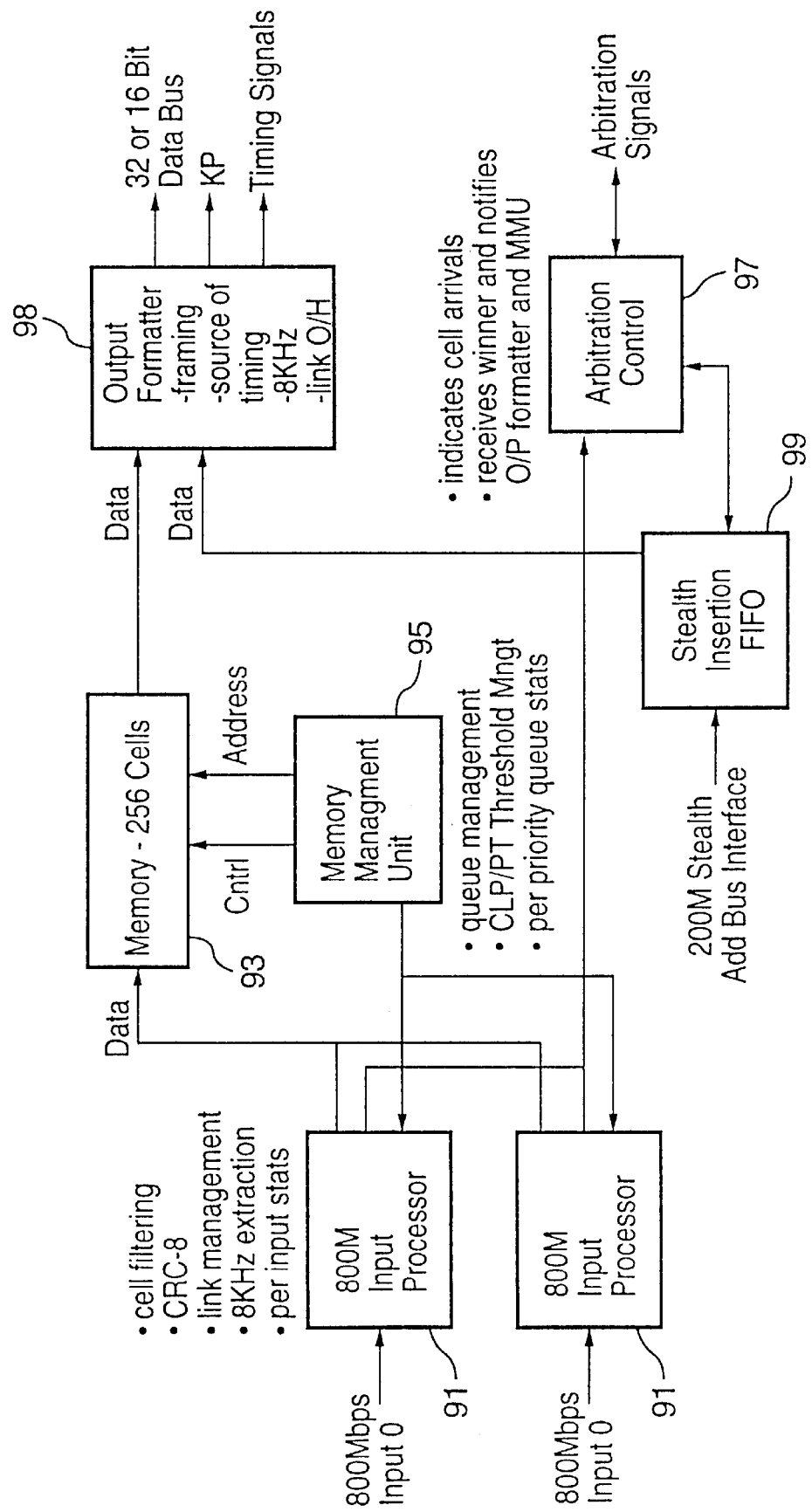
FIG. 8 is a block diagram showing a cell queuing core of the ASIC shown in FIG. 7.

The cell queuing core 85 is shown in greater detail with reference to FIG. 8 comprising 800 Mbps processing blocks 91 which perform clock detection, link termination, CRC checking and cell filtering functions. When an 800 Mbps input stream to the cell queuing core 85 is sourced from three 200 Mbps inputs (ie. multiplex mode) the cell filtering function of processors 91 is typically disabled. This allows all cells in the input streams to be queued. As per the 200 Mbps inputs, each 800 Mbps input can be enabled or disabled from having their respective cells enter queue memory 93.

Memory manager 95 controls four cell queues within memory 93, for providing a total of 256 cells of queuing space which can be flexibly allocated between the four queues. Memory manager 95 operates on the data contained within the four queues to process each cell in accordance with all aspects of the ATM cell header, including CLP discard and PTI congestion notification.

An arbitration control 97 provides information on the current state of the cell queues to an external arbiter (not shown). When multiple circuits share the same 800 Mbps output link, the external arbiter is required to decide which circuit source is the next cell and at which priority. The arbitration control 97 provides the external arbiter with all of the necessary information required to implement any queue service algorithm which can be downloaded and is reconfigurable at any time.

The output formatter 98 creates a formatted 800 Mbps link (as well as inserting the appropriate priority cell when so instructed by the external arbiter), in the form of a "supercell", as discussed in greater detail below.

Figure 9:
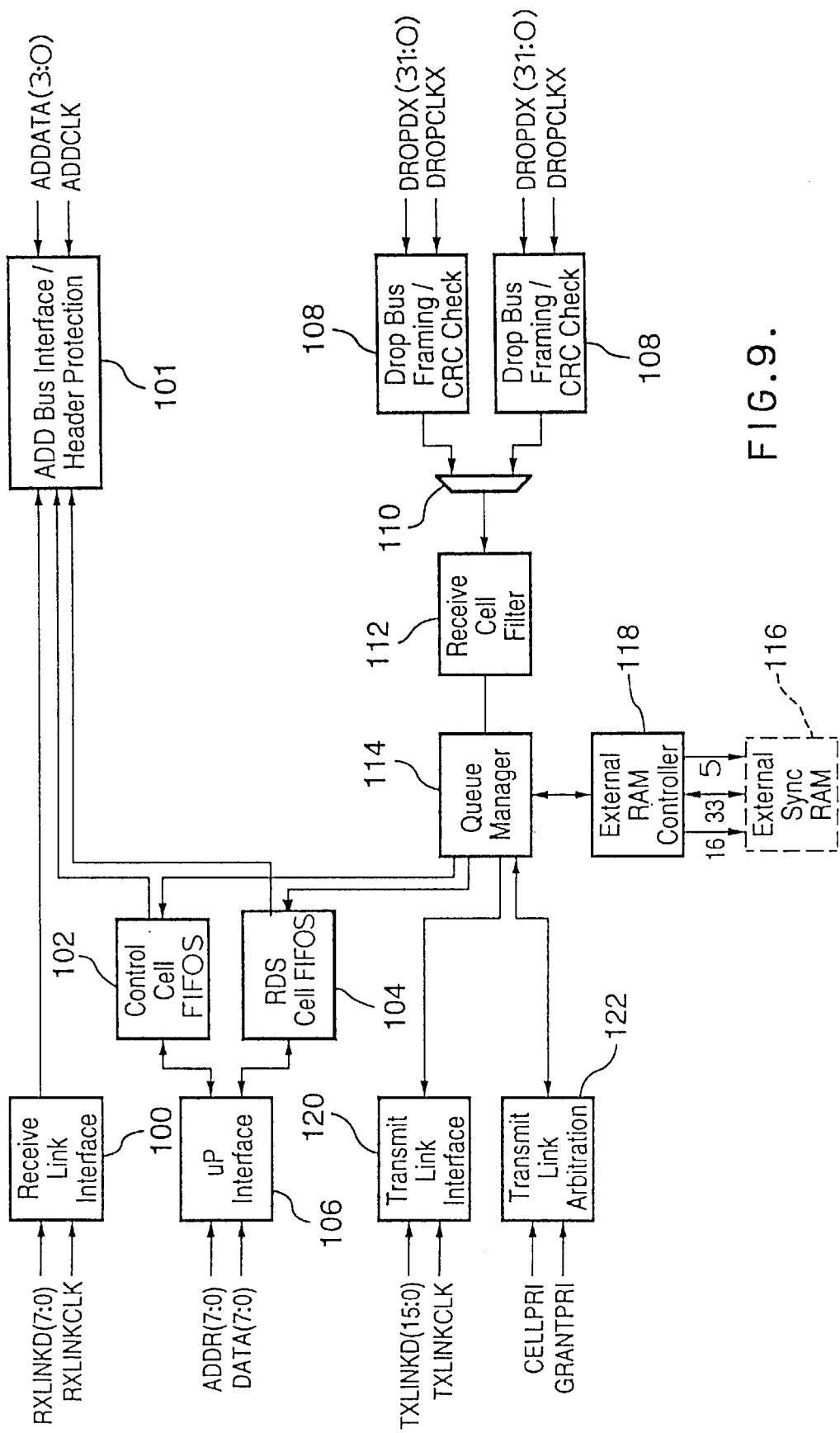
FIG. 9 is a block diagram of a standard interface ASIC in the interface circuit of FIG. 6 for receiving and transmitting formatted ATM cells to and from the switching fabric.

Insertion FIFO 99 is provided to allow control and real-time development system (RDS) cells to be transmitted onto the 800 Mbps output link. Details of the RDS functionality are provided below. As discussed in greater detail below, the interface circuit of FIG. 9 provides a standard RDS and control interface to the local microprocessor. The circuit of FIG. 7 provides an interface to the circuit of FIG. 9 to transmit these control/RDS cells onto the 800 Mbps output port. The 800 Mbps input processors 91 contain a plurality of registers which are used for cell filtering. Specifically, point-to-point and point-to-multipoint cell filtering is accomplished using internal "mask" and "value" registers against which input values may be compared and must be matched (or alternatively masked) in order for a point-to-point or point-to-multipoint cell to enter an internal queue from the 800 Mbps interface. In this regard, all cell filtering in the system of the present invention is conducted via pattern matching.

Before turning to FIG. 9, a brief description is provided herein of the RDS (Real-Time Development System) functionality of the ATM switching system according to the present invention.

RDS is used extensively in the system according to the present invention, to develop and debug software. Debugging can take place in a range of environments from a development lab to a customer site where it can be used on live equipment without impacting service or customer data. As discussed below, the RDS function of the present invention operates in an event mode and in a command mode.

RDS events are embedded in the actual software at development time and in most cases are not subsequently removed for two reasons: (1) events can assist in tracing subsequent problems, (2) taking them out would affect the real time execution of code, which may have real functional effects, even though the code has been designed so as to not be sensitive to execution speed.

An RDS event is simply a set of writes to an RDS event port, embedded in the software at significant software interfaces and points of interest. The data that is written to the port includes an event identifier and a variable length sequence of data bytes that define what software event is occurring. It is similar in concept to putting a "print" statement with the software to indicate that this portion of code is executing and using the print data to indicate exactly what is happening.

In the ATM switching system, RDS events are generated by nearly all of the processors in the system and the event data is placed on the ATM switching fabric along with control messaging and customer data. To reduce the amount of bandwidth consumed on the ATM switching fabric, the ASIC (FIG. 9) contains a hardware filter that can discard RDS events based on the event identifier. In normal operation of the ATM switching system according to the present invention, all of the events generated by all the processors in the system are discarded using the hardware filter of the ASIC in FIG. 9.

The events can be enabled onto the switching fabric by changing the state of these hardware filters. This can be done selectively for each interface ASIC (FIG. 9) in the system and for each of the 256 events that the ASIC supports. This allows someone with knowledge of the RDS events in the system to enable selective events to aid in diagnosis of problems.

RDS events can be displayed on a VT100 terminal or a workstation. Generally an additional card is installed into the system for filtering the RDS events off the switching fabric and formatting them for display on the VT100 or workstation. The ATM cells that carry the RDS event data indicate the source address and using this knowledge, the event identifier and the event data, text can be formatted and displayed on the VT1100 terminal or workstation that corresponds to the event which has occurred in the software. The control card of the ATM switching system is also capable of filtering the RDS event cells and formatting is them for display. This allows remote debugging of a live system since access to this control card is available across the network.

Since the events are left in the code, the priorities of code design are to keep the size of the event code to a minimum, to keep the processing load of event generation to a minimum, and to ensure that the proper events are within the code to allow the diagnosis of problems and visibility into the operation of the system.

As discussed above with reference to FIGS. 3 and 4, the contents of the header field of the cell are completely programmable, including the ATM header VCI/VPI fields. The CRC header protection field is calculated and inserted into the cell header automatically, and a two byte field is provided for a RDS source address to be used by the receiving end to identify the source of the cell. As discussed in greater detail below, an address mapped set of registers that store the fields of the cell header are provided in the interface ASIC of FIG. 9. This allows modifications to be made to portions of the header field without re-writing the whole header each time a small change is needed, (e.g. priority changes). With control over the ATM VCI/VPI fields, event cells can be routed directly out of the switching system as true ATM cells to a destination outside the node, without having to be relayed by the control complex or an RDS card. This feature allows event cells to be transmitted to a remote debug location directly, assuming that a connection to the network is available. However, it should be noted that the pre-pended bytes of FIGS. 3 and 4 (including the NCT bits) are lost when the cell exits the node, but this information is not usually needed if the receiving entity is expecting only RDS event cells.

In command mode, RDS is used to actively debug processors in the system by allowing source and assembly level debugging as well as memory read and write operations. According to this mode of operation, a host generates one or more RDS command cells, each comprising a command identifier and a variable length identifier for defining the command, to a target system. The target system responds by returning to the host an RDS event cell containing the results. The commands are very simple (eg. read memory at a given address, write memory to a given address with provided data, identify target processor type, return values of target processor registers, etc.) Using these simple command operations, the host system is capable of constructing an advanced functionality such as source level debugging, assembly level debugging, breakpoint insertion and stack tracing, etc.

When an RDS command cell is filtered off of the backplane by an interface ASIC (ie. the ASIC shown in FIG. 9), it queues the cell and generates a high priority non-maskable interrupt to the target processor on the associated card. The use of a non-maskable interrupt allows the RDS system in the command mode to reliably interrupt the target processor so that other interrupt handlers on the card can even be debugged using the RDS.

Since both RDS command and RDS event cells conform to standard ATM cell format in accordance with the present invention, these cells can be transmitted across an ATM network so that an RDS host processor can remotely debug a target processor by operating in a remote mode. The ingress interface circuitry (FIG. 6) of the system containing the target processor causes the cell type (NCT) to be set to RDS Command for RDS command cells arriving on the VP/VC (FIG. 6).

Turning now to FIG. 9, a functional block diagram is provided of the interface ASIC which performs ATM backplane functions required for any card to interface with the switching fabric. As such, the circuit of FIG. 9 is intended for any interface, hub or switching card that transmits and receives ATM cells through the system, such as the UCS interface card 21 discussed above with reference to FIG. 6.

In order to send cells into the switching fabric, the circuit of FIG. 9 provides a receive link interface 100 in the form of an externally timed interface for formatted ATM cells to be transmitted on the add bus 25. This receive link interface 100 operates at a maximum of 400 Mbps, although the maximum add bus rate is 200 Mbps, as discussed above.

The completely formatted ATM cells received from a UCS (or other) card via receive link 100, are applied to the add bus 25 via add bus interface/header protector 101 along with an inserted CRC-8 byte in the ATM HEC field. As discussed above with reference to FIG. 6, the UCS card assembles completely formatted cells using the header fields shown in FIGS. 3 and 4, except for the CRC-8 byte. The CRC-8 byte covers the seven octet (ie. byte) overhead as well as the four remaining octets of the standard ATM header.

Control cells and RDS cells can be applied to the add bus 25 through FIFOs 102 and 104 which are accessible through a microprocessor interface 106.

The circuit of FIG. 9 provides a separate interface for each of the redundant drop buses 27. For each drop bus 27, the circuit monitors for a loss of clock and for CRC errors on all cells, via drop bus framing/CRC check circuits 108. The signals output from circuits 108 are multiplexed at 110 and applied to a receive cell filter 112.

The received cells from the active fabric are then filtered via receive cell filter 112 to determine which cells are addressed to the associated interface circuit 21. Control/RDS cells and user data cells are filtered using the pre-defined Card Address field (i.e. the fourth byte in the point-to-point cell format of FIG. 3) to facilitate interface card redundancy, as discussed in greater detail below. Multi-cast cells are verified against entries in an external, 64K connection, multi-cast look-up table 116, also discussed in greater detail below.

Figure 10:
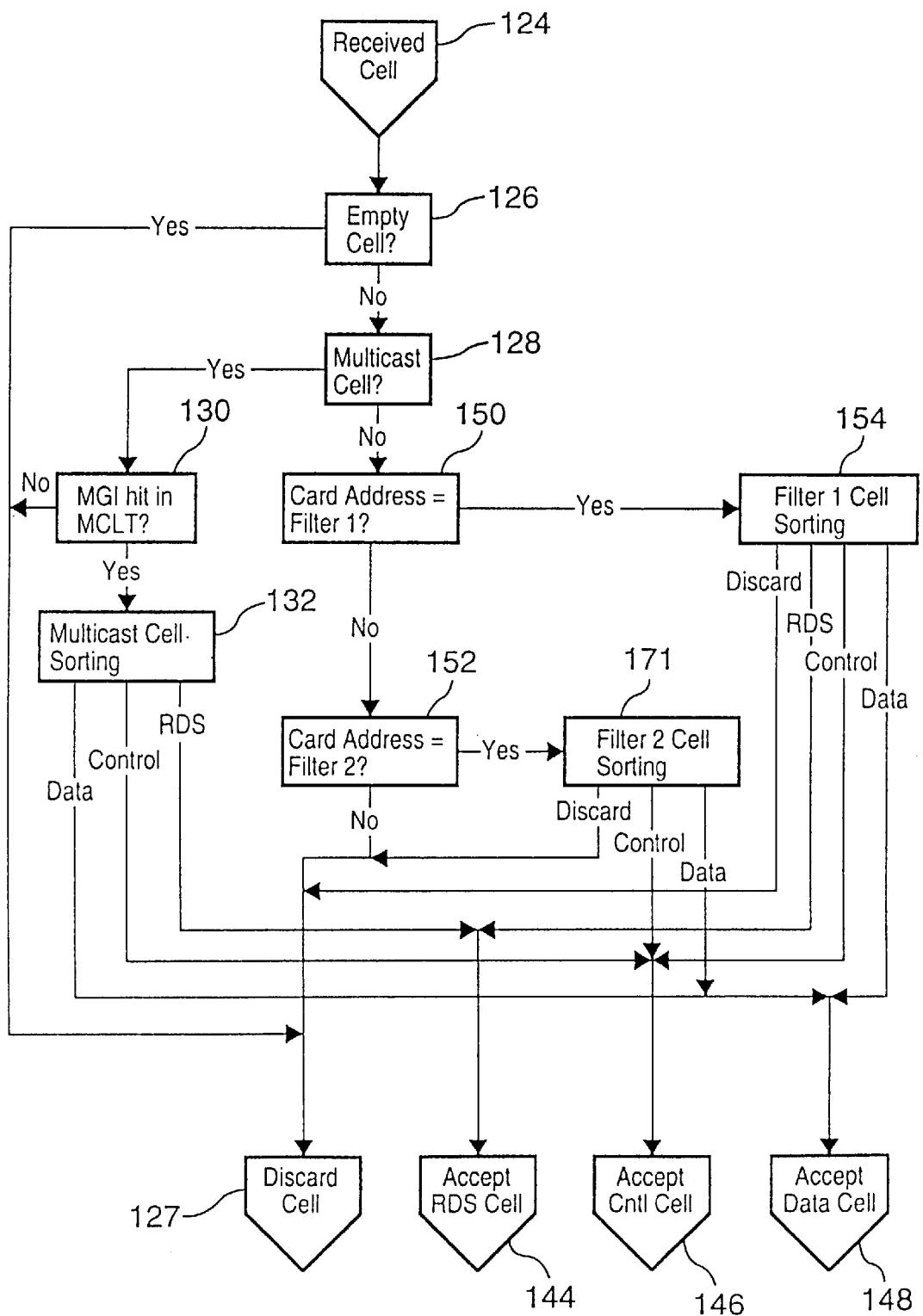
FIG. 10 is a flowchart showing operation of a receive filter in the interface circuit of FIG. 9.

Turning to FIG. 10, the receive cell filtering process executed by filter 112, is shown in detail. Upon receipt of a formatted ATM cell (step 124), empty cells are identified and discarded (step 126). Identification of empty cells is accomplished by checking the MT bit in the first octet of the formatted ATM header. Next, the Pt—Pt bit is queried to determine whether the ATM cell is formatted for point-to-point or point-to-multipoint addressing (step 128). Address filtering is then split into multi-cast and point-to-point portions of FIG. 10.

For multi-cast cells, the Multi-cast Group Identifier field is used to look up an enable bit in a multi-cast look-up table (MCLT) stored within an external RAM 116, discussed in greater detail below. If a match occurs (step 130), the cell is accepted. Otherwise, the cell is discarded (step 127). Accepted cells are then sorted according to the Newbridge Cell Type (NCT) field in the header (step 132).

Figure 11:
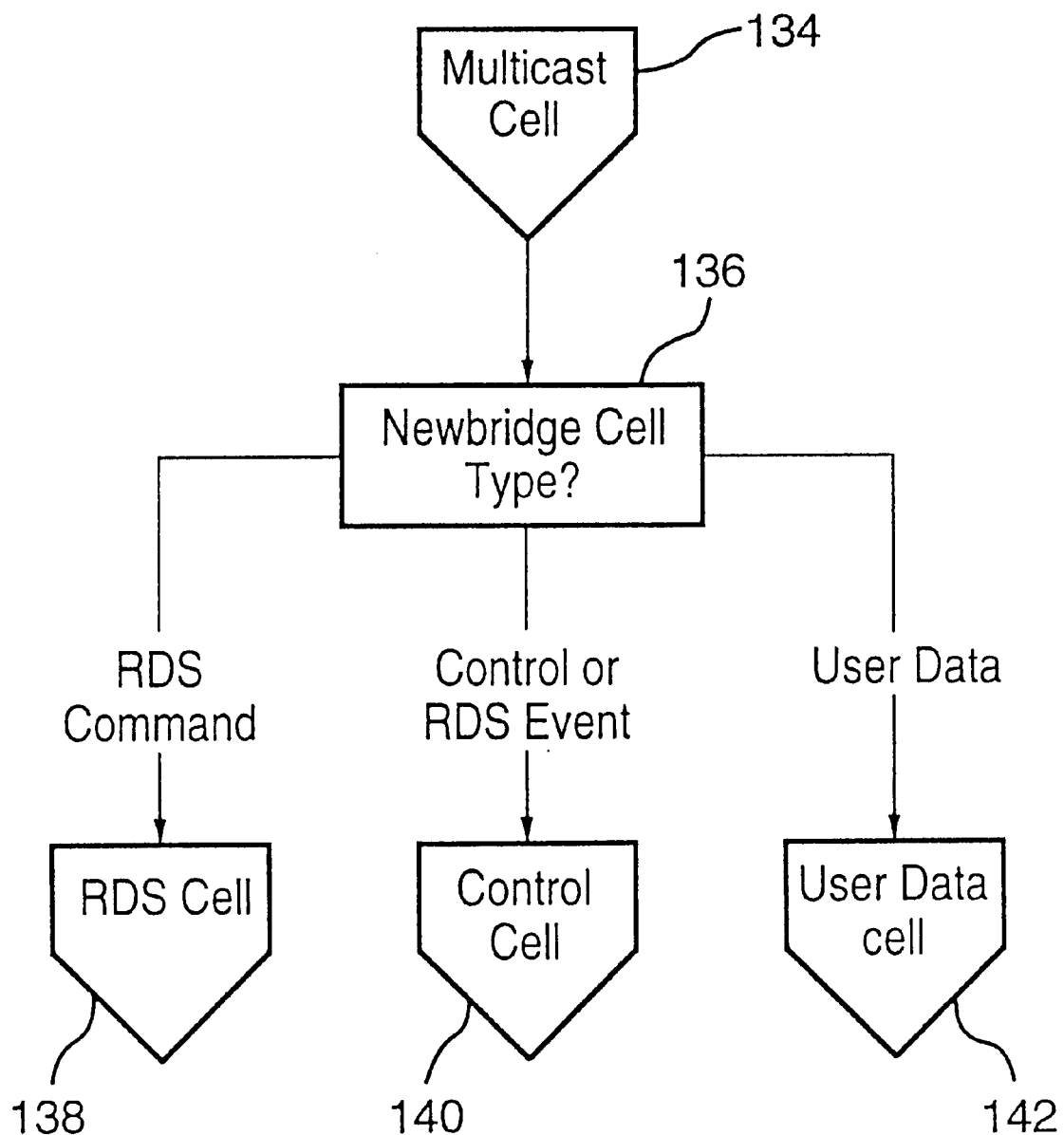
FIG. 11 is a flowchart showing details of a multicasting cell sorting procedure in the flowchart of FIG. 10.

Turning briefly to FIG. 11 in conjunction with Table E below, the multi-cast cell sorting step 132 is shown in greater detail.

TABLE E

| NCT | Cell Type |
|-----|-----------|
| 00  | User data |
| 01  | Control   |
| 10  | RDS Command |
| 11  | RDS Event |

Upon receipt of a multi-cast cell (step 134), the NCT bits are analyzed to identify an RDS Command, User Data, and Control or RDS Event (step 136). In response, sorting is continued on the basis of the cell being identified as either an RDS Cell (step 138), a Control Cell (step 140) or a User Data Cell (step 142).

Returning to FIG. 10, the identified RDS Cells, Control Cells and User Data Cells are then accepted by the filter 112, as represented by steps 144, 146 and 148.

For point-to-point cells, the Card Address field of the expanded ATM header is compared against the contents of two internal filter registers, hereafter referred to as F1 and F2. An exact match is required against the filter register contents before a cell is deemed to have passed the filter function. Cells which do not match F1 or F2 are discarded (steps 150, 152 and 127).

Control cells can be required to match F1, F2, or either F1 or F2 before being accepted. User Data Cells pass through an identical stage. This allows the Control Cells to be filtered off of one address, for example, the physical card address, and the User Data Cells to be filtered off of other addresses, for example, the physical card address of the redundant card. This also allows the User Data Cells (and/or the Control Cells) to be filtered off of either F1 or F2. This permits cells addressed to either card of a redundant pair to be accepted by both. RDS Cells are accepted only of the match F1.

Figure 12:
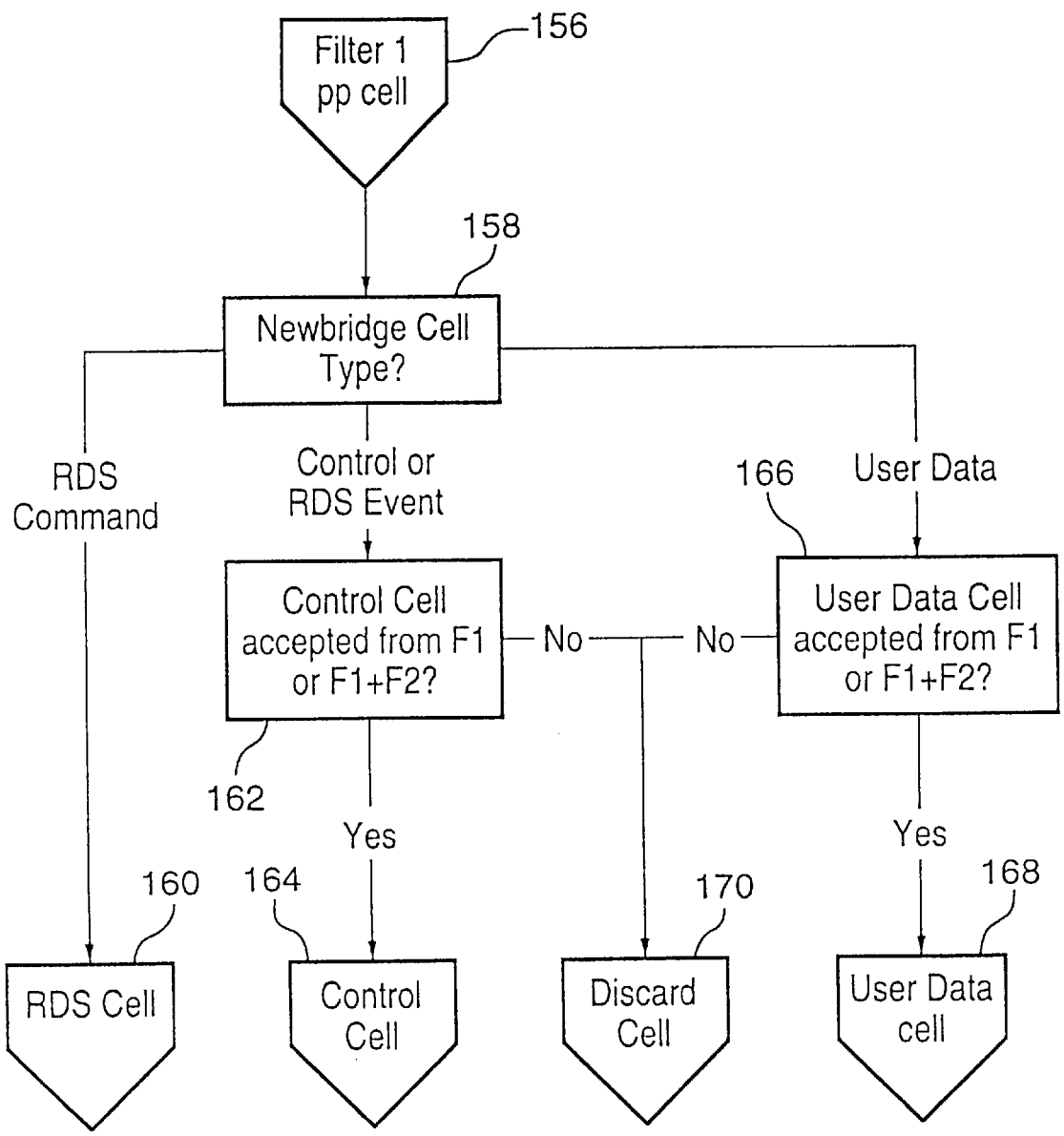
FIG. 12 is a flowchart showing operation of a first filter sorting algorithm in the flowchart of FIG. 10.
Figure 13:
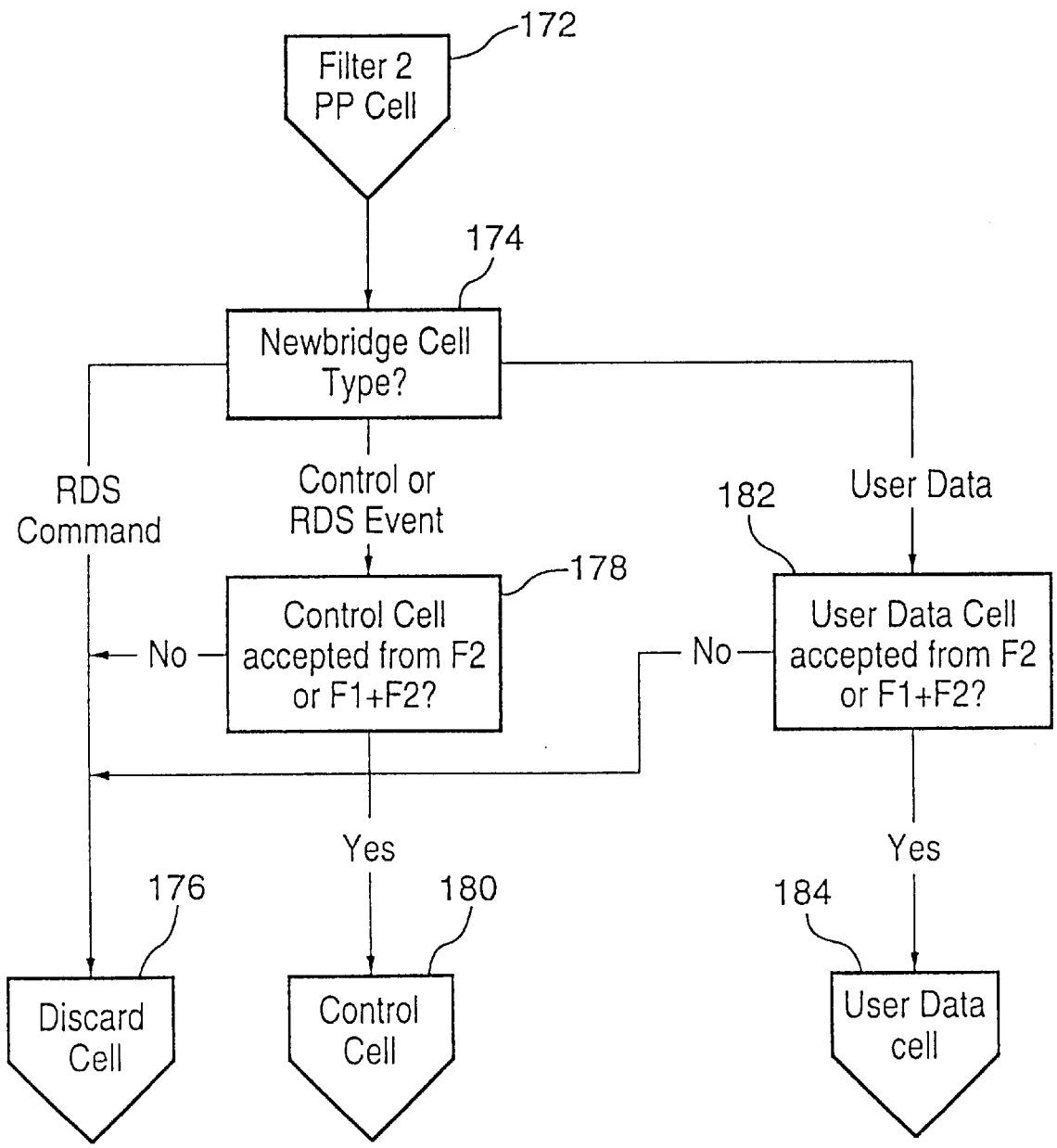
FIG. 13 is a flowchart showing operation of a second filter sorting algorithm in the flowchart of FIG. 10.

Details of the sorting and filtering procedure for F1 and F2 matched point to-point cells are shown in FIGS. 12 and 13, respectively.

Once a point-to-point cell has matched F1 (step 150) it is then sorted by the expanded ATM header information (step 154). With reference to FIG. 12, upon receipt of the point-to-point (PP) cell (step 156), the Newbridge Cell Type is identified using the criteria set forth in Table E, above (step 158). RDS Command Cells are accepted (step 160). Control Cells and RDS Event Cells are accepted if the Control Filter Select field (CFS[1:0]) in an internal filter select register of filter 112 is programmed to accept F1 passed cells. The CFS bit field is shown in Table F, below. Control and RDS Events cells will therefore be accepted if the CFS bit field is "10" or "11" (steps 162 and 164).

TABLE F

| CFS (1:0) | Cell Filter Selected |
|-----------|----------------------|
| 00        | Undefined            |
| 01        | Filter 2             |
| 10        | Filter 1             |
| 11        | Filter 1 or Filter 2 |

User Data Cells are accepted if the User Filter Select field (UFS[1:0]) in the Filter Select Register is programmed to accept F1 passed cells (steps 166 and 168). The UFS bit field is shown below in Table G. User Data Cells will therefore be accepted if the UFS bit field is "10" or "11". If either a Control Cell or a User Data Cell fails to pass either F1 or F1+F2, then the cell is discarded (step 170).

TABLE G

| UFS (1:0) | Cell Filter Selected |
|-----------|----------------------|
| 00        | Undefined            |
| 01        | Filter 2             |
| 10        | Filter 1             |
| 11        | Filter 1 or Filter 2 |

Once a point-to-point (PP) cell has matched F2 (step 152), it is then sorted by the expanded ATM header information (step 171). With reference to FIG. 13, upon receipt of the point-to-point (PP) cell (step 172), the Newbridge Cell Type is identified using the criteria set forth in Table E, above (step 174). RDS command cells are discarded (step 176). Control Cells and RDS Event Cells are accepted if the Control Filter Select field (CFS[1:0]) in the internal filter select register of filter 112 is programmed to accept F2 passed cells. The CFS bit field is shown in Table F, above. Control and RDS Events cells will therefore be accepted if the CFS bit field is "01" or "11" (steps 178 and 180).

User Data Cells are accepted if the User Filter Select field (UFS[1:0]) in the Filter Select Register is programmed to accept F2 passed cells (steps 182 and 184). The UFS bit field is shown below in Table G, above. User Data Cells will therefore be accepted if the UFS bit field is "01" or "11". If either a Control Cell or a User Data Cell fails to pass either F1 or F1+F2, then the cell is discarded (step 176).

The interface ASIC of FIG. 9 stores multicast lookup tables in the same external RAM 116 that is used for queue memory. The first 2K×32 block of memory, from address 0 to 800 hex, is reserved for this purpose. The lookup tables are used when a multicast cell arrives, to determine if the multicast group is destined for the particular card. To accomplish this, the 16-bit Multicast Group Identifier in the expanded ATM header of the cell is used to address a single bit of the multicast block of external memory. The 16-bit identifier is translated into ani 11-bit address to access the 2K block of external memory, and a 5-bit identifier to select which bit of the 32-bit wide data word to choose. This bit, a yes/no indicator of the validity of the multicast cell to this ASIC, is used when processing incoming cells. A "0" in the memory location indicates that the multicast cell is valid, and a "1" indicates that the multicast cell is invalid. When no external RAM 116 is used (which may occur in bypass mode), the data pins of the external RAM controller 118 may be tied to a logic high (eg. "1") level, so that all multicast cells outside the internal lookup range will be discarded. Alternatively, the data pins may be wired to present a logic low (ie. "0") value when a multicast "read" is performed, so that all cells are accepted.

An internal lookup feature is supplied for the use of an interface ASIC without external RAM 116. The uppermost 32 bits of the external memory multicast block are transparently mapped to an internal 32-bit memory. This enables a subset of the multicast capabilities for cards that have no external RAM. User access of the 32-bit internal field is transparent; it is accessed through the microprocessor as if it were in external RAM. The 32-bits of external RAM are permanently mapped over.

Receive cells which have been filtered by Receive Cell Filter 112 are then sent to the designated receive queues via queue manager 114. User data cells are queued in external memory 116, through a 1.5 Gbps memory interface 118. The queue manager 114 of the preferred embodiment supports up to 4096 cells of external storage. RDS command cells are sent to the RDS cell FIFOs 104 for access through the processor port 106. Control cells and RDS event cells are sent to the internal sixteen cell FIFO 102 for access through the processor port 106. The operation and flow of RDS command cells, control cells and RDS event calls discussed in greater detail below.

Receive queuing to transmit link interface 120 can be bypassed (i.e. queue manager 114 can be disabled for receive cells). This allows the circuit of FIG. 9 to function as a receive cell filter for an external cell queuing device. However, the RDS and control cells are nonetheless sent to the internal FIFOs 102 and 104, if so enabled.

Finally, the receive cells are sent out the transmit link interface 120, under control from an external clock (TXLINKCLK).

The circuit of FIG. 9 services the priority "3" queue via queue manager 114 if it contains a cell, and then the priority "2" queue and so on down to priority "0". However, this feature may be over-ridden via the transmit link arbitration port 122. This port provides an indication of a cell arrival, with the cell priority, to the aforementioned external arbiter (not shown). In return, the external arbiter can force the circuit of FIG. 9 to service a given priority queue for the next cell, regardless of whether a higher priority queue is currently non-empty.

Figure 14:
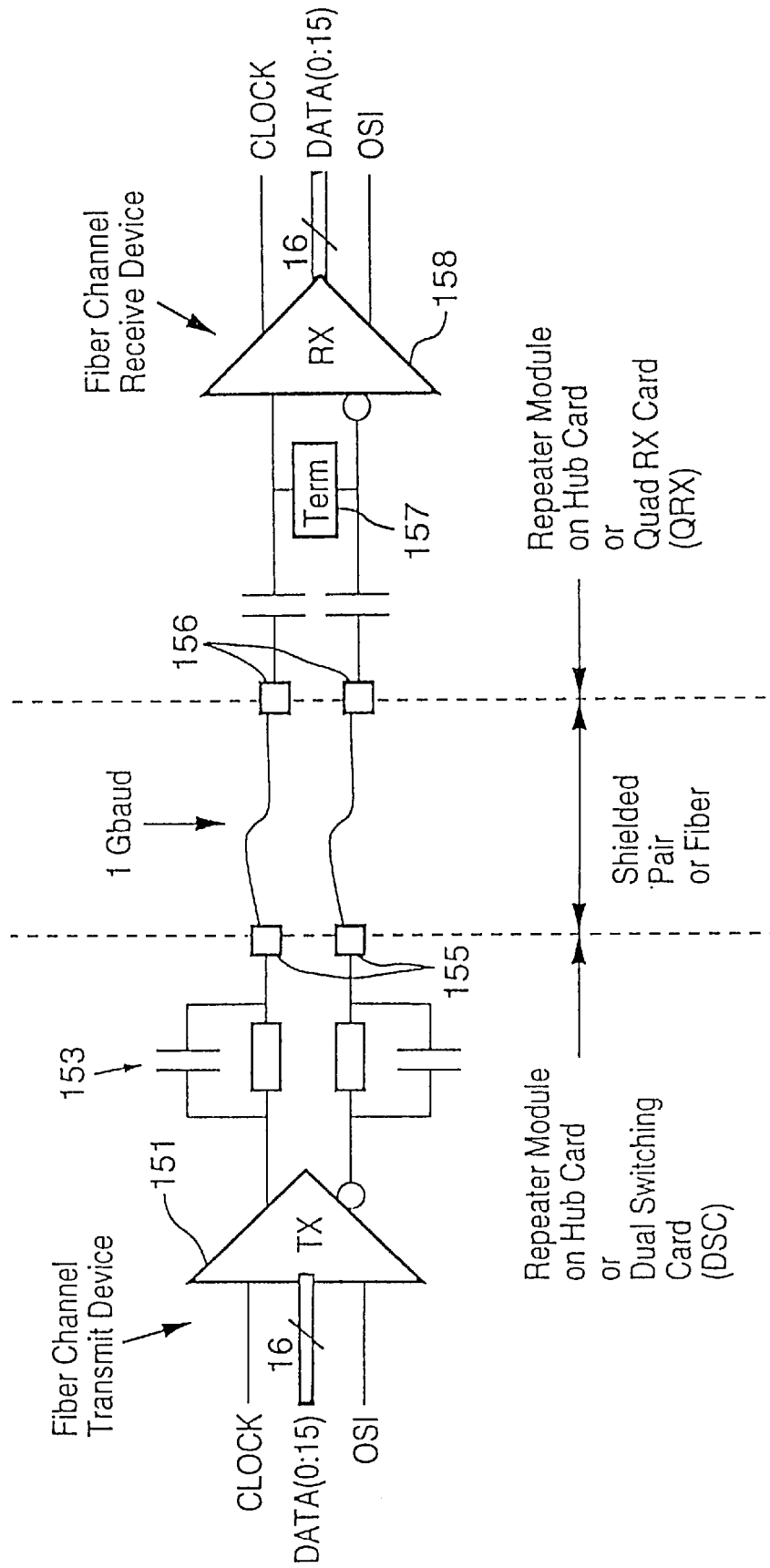
FIG. 14 is a functional schematic diagram of an intershelf link according to the present invention.

The 800 Mbps Inter-Shelf Link (ISL 5) is the common mechanism for connecting all component shelves together in the system of the present invention. The ISL is a high-speed serial link which uses the lower layers of the Fiber Channel specification to transfer digital signals between access shelves 3A, 3B, etc., in a multi-shelf access arrangement, and between switching core 1 and the access shelves 3A, 3B, etc. As discussed above, each hub card 23 generates proprietary "supercells" for transmission along the ISLs 5 and drop bus 27 using Fibre Channel technology. Specifically, the output formatter 98 (FIG. 8) of the switching ASIC cell queuing core 85 (FIG. 7), generates supercells in accordance with the concept of an Ordered Set, as discussed in greater detail below. A representative ISL 5 is shown in FIG. 14 comprising a high speed parallel to serial converter (IX 151), equalization circuitry 153, connectorization 155, physical transport media (eg. shielded pair copper wires or optical fiber), receiver coupling 156, termination 157, and a high speed serial to parallel converter (RX 158). The 8B/10B code requires a 1 Gbaud line rate in order to support the 800 Mbps data rate on the link. The physical transport media for the Fiber Channel interface can be either electrical or optical.

One of the features of the 8B/10B encoding scheme is the ability to communicate special command characters over the serial link. The K28.5 code is a particularly special command character in that it is used by the receiver 158 to establish byte and word synchronization. Additionally the K28.5 character is used within the system of the present invention for cell delineation and optionally for the transport of the 8 Khz system synchronization signal, as discussed in greater detail below.

The Fiber Channel specification introduces the concept of an Ordered Set. An Ordered Set (OS) is a four byte grouping, composed of the K28.5 character and three additional data bytes. Ordered Sets can be sent over the ISL 5 by asserting a special signal on the Fiber Channel transmit device 151, and their presence is detected at the receiver 158 by the assertion of a OS indication signal.

An ordered set is defined as shown in Table H.

TABLE H

| Bit 31–Bit 24 | Bit 23–Bit 16 | Bit 15–Bit 8 | Bit 7–Bit 0 |
| --- | --- | --- | --- |
| OS Type Bitfield | K28.5 Special Character | Drive & Scan Byte (SOS only) | RFU |

The second byte is always the K28.5 special character. The first byte is a field of 8 bits for encoding the various OS types. Since an OS may be considered to signal an event or status condition, each condition is assigned one bit in the field (as shown in Table I) which is set to indicate the relevant event or status condition, allowing a single OS to encode numerous types of OS "events". These conditions are not necessarily mutually exclusive—for instance, an OS with a first byte equal to 05H would indicate both an SOS and an STOS.

TABLE I

| Bits 7–3 | Bit 2 | Bit 1 | Bit 0 |
| --- | --- | --- | --- |
| RFU Reserved For Future Use | STOS System Timing OS | ETOS Extracted Timing OS | SOS Supercell OS |

The Drive & Scan field is only used if the OS Type Bitfield's SOS bit is asserted. Otherwise, it is treated as a "don't care" field. Upon reception of an SOS, the switching ASIC of FIGS. 7 and 8 will latch the Drive & Scan byte in an internal register of the 800 Mbps input processors 91. For transmission of an SOS, the output formatter 98 (FIG. 8) derives the value of its Drive & Scan byte from an internal register. This provides out-of-band communication from one switching ASIC through the Fiber Channel to the next downstream switching ASIC.

An Idle Ordered Set is defined by all bits in the OS Type Bitfield having the value 0. RFU bits are set to zero by default.

The Inter-Shelf Link makes use of Fiber Channel technology and the notion of a "supercell" to aid in cell delineation. As indicated above, a supercell consists of a Supercell Ordered Set (SOS) followed by 128 60byte proprietary ATM cells.

The Supercell format is shown below in Table J.

TABLE J

| | Bit Number | | |
| --- | --- | --- | --- |
| Word | 15 | 8  7 | 0 |
| 0 | OS Type Bitfield | | K28.5 |
| 1 | Drive & Scan byte | | RFU |
| 2 to 3,841 | 128 × 60 Byte Newbridge cells | | |

Supercells are used on the Fiber Channel ISLs 5 and the local drop busses 27, as well as internally in certain cards. The presence of any Ordered Set is always indicated by some sort of Ordered Set Indication (OSI) signal. The 8 Khz timing signal is carried on these same Fiber Channel links and local drop busses via the supercells. The two Timing Ordered Sets, ETOS and STOS (Table I), are used to distribute timing information through-out the system, as discussed in greater detail below. They may therefore occur at any time, even in the middle of a supercell or ATM cell.

Each switching ASIC (FIG. 7) is capable of generating and outputting a continuous stream of supercells. This data stream consists only of ordered sets and proprietary formatted 60-byte cells. Cells that are received by a switching ASIC for transmission are inserted into a cell slot within this output stream of supercells. When a 60-byte formatted ATM cell is not available for transmission, either an empty cell or one or more Idle Ordered Sets are inserted, since both represent unused bandwidth.

As discussed above, since some interface cards 21 require a standard timing reference, the system of the present invention provides means for distributing system timing throughout the switching fabric. Any UCS in an peripheral shelf 3A, 3B, etc., can contain an interface card 21 which acts as a reference clock source (eg. a T1 interface). If a card is chosen to be a reference clock source, it will be enabled to transmit its clock signal to the local hub card 23 via a backplane line designated as ESYNC. AU interface cards 21 share this line to the hub card 23, and only drive the line if enabled. The ESYNC signal received by hub card 23 is distributed to the rest of the system as an ETOS signal (Table I) via the switching fabric. The ETOS signal is routed through the system to a System Synchronization Unit (SSU), which uses the received EROS signal to generate STOS from the ETOS timing reference. The STOS signal is then re-distributable throughout the system, for receipt of STOS by any card in the system. The SSU receives the ETOS reference clock signal via the switch fabric drop bus 27. In this way, the reference clock signal can reach the system synchronization unit (SSU) regardless of where the SSU is located.

Synchronous and asynchronous transmission interfaces can both be used to provide reference clocks. Synchronous interfaces inherently contain reference timing in the interface's data signal. Asynchronous interfaces can contain reference timing in the form of the PLCP frame rate, which has no relationship to the physical data rate of the interface. An asynchronously provided reference clock usually contains considerable jitter, typically at 8 Khz, but this can easily be filtered out by the SSU. Examples of synchronous interfaces would be E1 and T1; E3 and T3 carry reference timing either asynchronously or synchronously.

As discussed above, the system synchronization unit (SSU) is responsible for generating the system clock STOS from the selected reference clock ETOS. The SSU is essentially a very stable PLL, coupled with control logic to allow selection of different reference sources, and additional logic to minimize system clock perturbations that might occur during reference clock changes or failures. The PLL comprises a DAC, VCXO, phase comparator in feedback configuration, in the usual manner.

Distribution of the system clock is accomplished via the switching fabric, providing distribution to all interface cards 21 without requiring a dedicated clock network. The mechanism by which this is done is the aforementioned Ordered Set (OS). As discussed above, an Ordered Set (OS) comprises 32 bits of data which are transmitted on the drop bus 27. The OS is uniquely identified by a corresponding Ordered Set Indicator (OSI) pulse. A single bit in the 32 bit data pattern indicates if the OS is also a System Timing OS (STOS), a special case of OS which is the equivalent of a rising edge of an 8 Khz clock pulse.

The same mechanism is used by hub cards 23 in order to transmit the reference clock from an interface card 21 to the SSU. In this case a single bit in the OS pattern is used to indicate if the OS is also an ESYNC Timing OS (ETOS), which is a special case of an OS which is the equivalent of a rising edge of an 8 Khz reference clock pulse.

In the event that the system and reference clock signals experience simultaneous rising edges, the STOS and EROS must occur simultaneously. This is possible within a single OS by asserting both the STOS and ETOS bits, therefore the switching fabric is capable of distributing multiple clock signals simultaneously.

Due to the flexibility of the reference clock and system clock distribution method, the location of the SSU within the system is also very flexible. The SSU must be located within an peripheral shelf 3A, 3B, etc., but there is no restriction as to which peripheral shelf within the system contains the SSU, unless the configuration matrix is not a non-blocking one. The SSU can be located on any hub card 23, or can be located on a dedicated card that is installed in a UCS slot.

Distribution of ETOS and/or STOS timing signals through a multi-stage switching core can be accomplished in many ways. FIG. 16 shows a possible distribution scenario in the 32×32 switching core 1 (depicted here in stages 1A, 1B, etc.). Note that it is sufficient for only one of the ISLs to carry TOSs out of the first and second stages 1A and 1B of the switch.

Modifications and alternative embodiments of the invention are possible within the sphere and scope of the invention as described herein.

We claim:

1. A communication system comprising:
a) a hub slot for receiving any one of a plurality of hub cards for receiving and transmitting data cells;
b) a plurality of universal card slots;
c) a plurality of interface cards insertable into any one of said plurality of universal card slots for receiving incoming ones of said data cells containing data and transmitting outgoing ones of said data cells containing data;
d) an add bus having respective data links connected between individual ones of said universal card slots and said hub slot for receiving said outgoing ones of said data cells from said plurality of interface cards and transmitting said outgoing ones of said data cells to said one of said plurality of hub cards;
e) a drop bus having a single data link connected between all of said universal card slots and said hub slot for transmitting said incoming ones of said data cells from one of said plurality of hub cards to said plurality of interface cards; and
f) means within each of said interface cards for filtering said incoming ones of said data cells from said drop bus and thereby routing said data cells to an appropriate one or more of said plurality of interface cards.

2. The communication system of claim 1, wherein at least one of said plurality of hub cards comprises an internal communication path between said add bus and said drop bus.

3. A communication system comprising:
a) a hub slot for receiving any one of a plurality of hub cards for receiving and transmitting data cells;
b) a plurality of universal card slots;
c) a plurality of interface cards insertable into any one of said plurality of universal card slots for receiving incoming ones of said data cells containing data and transmitting outgoing ones of said data cells containing data;
d) an add bus having respective data links connected between individual ones of said universal card slots and said hub slot for receiving said outgoing ones of said data cells from said plurality of interface cards and transmitting said outgoing ones of said data cells to said one of said plurality of hub card;

e) a drop bus having a single data link connected between all of said universal card slots and said hub slot for transmitting said incoming ones of said data cells from one of said plurality of hub cards to said plurality of interface cards; and f) means within each of said interface cards for filtering said incoming ones of said data cells from said drop bus and thereby routing said data cells to an appropriate one or more of said plurality of interface cards;

wherein at least one of said plurality of hub cards further comprises a plurality of first inputs connected to respective data links of said add bus, a second input connected to a switching means, a first output connected to said drop bus and a second output connected to said switching means, for receiving and concentrating said outgoing ones of said data cells into a high-speed output data stream for receipt by said switching means and for receiving a high-speed input data stream from said switching means and applying said high-speed input data stream to said drop bus for receipt by said appropriate one or more of said interface cards.

4. The communication system of claim 3, wherein said switching means comprises a high-speed data link between said second output and said second input of said one of said plurality of hub cards.

5. The communication system of claim 3, wherein said switching means comprises a cell switching core having at least one input thereof connected to said second output of said one of said plurality of hub cards and at least one output thereof connected to said second input of said one of said plurality of hub cards.

6. A communication system comprising:

a) a plurality of interconnected universal card slots;

b) a plurality of interface cards and control cards insertable into said universal card slots for receiving incoming ATM cells containing routing information and either data or control and diagnostic information, respectively, and transmitting outgoing ones of said ATM cells containing routing information and either data or control and diagnostic information, respectively;

c) means within each of said interface cards and control cards for pre-pending to said outgoing ones of said ATM cells a plurality of additional header bytes to provide multiple system functions in addition to ATM cell routing in accordance with said routing information; and d) means for receiving said outgoing ones of said ATM cells, filtering said additional header bytes and in response implementing predetermined ones of said multiple system functions.

7. The communication system of claim 6, wherein one of said multiple system functions comprises selective point-to-point or point-to-multipoint routing of said outgoing ones of said ATM cells within said system.

8. The communication system of claim 6, wherein one of said multiple system functions comprises in-band control and diagnostics.

9. The communication system of claim 6, wherein one of said multiple system functions comprises priority queuing of said ATM cells.

10. The communication system of claim 6, wherein one of said multiple system functions comprises simplified ATM cell egress statistics gathering.

11. The communication system of claim 6, wherein one of said multiple system functions comprises error detection across said ATM cells and pre-pended additional header bytes.

12. A communication system comprising a plurality of series connected peripheral shelves, each of said peripheral shelves having a hub card, an add bus connected to said hub card and a drop bus connected to said hub card, wherein at least one of said plurality of series connected peripheral shelves has at least an input for receiving high speed data from at least an adjacent one of said peripheral shelves, and at least an output for transmitting high speed data to said at least adjacent one of said peripheral shelves, wherein said hub card includes an input for receiving data from respective links of said add bus, and an output for transmitting data to said drop bus.

* * * * *